United States Patent
Omura

(10) Patent No.: US 9,959,894 B2
(45) Date of Patent: May 1, 2018

(54) MAGNETIC TAPE AND METHOD OF MANUFACTURING THE SAME

(71) Applicant: FUJIFILM Corporation, Tokyo (JP)

(72) Inventor: Kazufumi Omura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 253 days.

(21) Appl. No.: 14/870,618

(22) Filed: Sep. 30, 2015

(65) Prior Publication Data

US 2016/0093323 A1    Mar. 31, 2016

(30) Foreign Application Priority Data

Sep. 30, 2014 (JP) ................................. 2014-202542

(51) Int. Cl.
| | |
|---|---|
| G11B 5/716 | (2006.01) |
| G11B 5/733 | (2006.01) |
| G11B 5/71 | (2006.01) |
| G11B 5/78 | (2006.01) |

(52) U.S. Cl.
CPC ............... *G11B 5/733* (2013.01); *G11B 5/71* (2013.01); *G11B 5/78* (2013.01)

(58) Field of Classification Search
CPC ........... G11B 5/71; G11B 5/7305; G11B 5/78; G11B 5/8404; G11B 5/842; G11B 5/733; G11B 5/735; G11B 5/738
See application file for complete search history.

(56) References Cited

U.S. PATENT DOCUMENTS

| | | | |
|---|---|---|---|
| 5,445,881 A | 8/1995 | Irie | |
| 5,786,074 A | 7/1998 | Soui | |
| 6,254,964 B1 | 7/2001 | Saito | |
| 2001/0038928 A1 | 11/2001 | Nakamigawa | |
| 2004/0018388 A1 | 1/2004 | Kitamura et al. | |
| 2009/0027812 A1 | 1/2009 | Noguchi | |
| 2012/0045664 A1* | 2/2012 | Tanaka | G11B 5/71 428/840.2 |
| 2013/0029183 A1 | 1/2013 | Omura | |
| 2016/0064025 A1 | 3/2016 | Kurokawa | |
| 2016/0093323 A1 | 3/2016 | Omura | |
| 2017/0032812 A1 | 2/2017 | Kasada | |

FOREIGN PATENT DOCUMENTS

| | | |
|---|---|---|
| JP | 11-273051 A | 10/1999 |
| JP | 2002-367142 A | 12/2002 |
| JP | 2003-323710 A | 11/2003 |
| JP | 2006-286114 A | 10/2006 |
| JP | 2008-243317 A | 10/2008 |
| JP | 2011-210288 A | 10/2011 |

OTHER PUBLICATIONS

Notice of Allowance dated May 8, 2017 from the U.S. Patent & Trademark Office in co-pending U.S. Appl. No. 14/978,834.
Notice of Allowance dated May 8, 2017 from the U.S. Patent & Trademark Office in co-pending U.S. Appl. No. 14/757,555.
Office Action dated Dec. 6, 2016 in copending U.S. Appl. No. 14/757,555.
Office Action dated Dec. 5, 2016 in U.S. Appl. No. 14/978,834.
Office Action dated Sep. 26, 2017 issued by the Japanese Patent Office in counterpart Japanese Application No. 2014-265723.
Office Action dated Sep. 26, 2017 issued by the Japanese Patent Office in counterpart Japanese Application No. 2015-249264.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

The magnetic tape comprises a nonmagnetic layer comprising nonmagnetic powder and binder on a nonmagnetic support, and comprises a magnetic layer comprising ferromagnetic powder and binder on the nonmagnetic layer, wherein a fatty acid ester, a fatty acid amide, and a fatty acid are contained in either one or both of the magnetic layer and the nonmagnetic layer, with the magnetic layer and nonmagnetic layer each comprising at least one selected from the group consisting of a fatty acid ester, a fatty acid amide, and a fatty acid, a quantity of fatty acid ester per unit area of the magnetic layer in extraction components extracted from a surface of the magnetic layer with n-hexane falls within a range of 1.00 mg/m$^2$ to 10.00 mg/m$^2$, and a weight ratio of the quantity of fatty acid ester per unit area of the magnetic layer to a combined total of a quantity of fatty acid amide and a quantity of fatty acid, quantity of fatty acid ester/(quantity of fatty acid amide+quantity of fatty acid), per unit area of the magnetic layer falls within a range of 1.00 to 3.00 in the extraction components.

15 Claims, No Drawings

MAGNETIC TAPE AND METHOD OF MANUFACTURING THE SAME

CROSS-REFERENCE TO RELATED APPLICATIONS

This application claims priority under 35 U.S.C 119 to Japanese Patent Application No. 2014-202542 filed on Sep. 30, 2014. The above application is hereby expressly incorporated by reference, in its entirety.

BACKGROUND OF THE INVENTION

Field of the Invention

The present invention relates to a magnetic tape and a method of manufacturing the same.

Discussion of the Background

Magnetic recording media include tape-shaped media and disk-shaped media. Magnetic recording media in the form of tapes, that is, magnetic tapes, are primarily employed in storage applications such as data-backup tapes. To record and reproduce signals on a magnetic tape, the magnetic tape is normally run within a drive and the surface of the magnetic layer and the magnetic head (also referred to simply as "head", hereinafter) are brought into contact (slide). When running is repeated in a state in which the coefficient of friction is high during sliding of the surface of the magnetic layer and the head, the output sometimes ends up varying (spacing loss) due to the spacing resulting from shavings that are generated by shaving of the surface of the magnetic layer. Such spacing loss may cause a drop in electromagnetic characteristics with repeated running.

By contrast, to prevent an increase in the coefficient of friction during running, Japanese Unexamined Patent Publication (KOKAI) No. 2002-367142, which is expressly incorporated herein by reference in its entirety, proposes placing a lubricant within the magnetic layer and/or on the magnetic layer.

SUMMARY OF THE INVENTION

Japanese Unexamined Patent Publication (KOKAI) No. 2002-367142 specifically discloses fatty acid esters as desirable lubricants, and proposes the use of the quantity of lubricant extracted by n-hexane as an indicator of the quantity of lubricant present approximately on the surface of the magnetic tape. Specifically, Japanese Unexamined Patent Publication (KOKAI) No. 2002-367142 specifies the quantity of lubricant extracted by n-hexane per unit area of the magnetic layer as 200 to 1,000 mg/m$^2$ (see claim 1 in Japanese Unexamined Patent Publication (KOKAI) No. 2002-367142).

By the way, the magnetic tape described in Japanese Unexamined Patent Publication (KOKAI) No. 2002-367142 comprises a single-layer magnetic layer on a nonmagnetic support (for example, see Examples in Japanese Unexamined Patent Publication (KOKAI) No. 2002-367142). However, multilayer configurations of magnetic tapes having a magnetic layer and a nonmagnetic layer are also widely known. The use of such a multilayer configuration in a magnetic tape is advantageous for achieving higher density recording by thinning the magnetic layer and the like. Accordingly, the present inventor examined running durability in magnetic tapes with multilayer configurations. He found that when just the quantity of lubricant extracted by n-hexane was controlled as described in Japanese Unexamined Patent Publication (KOKAI) No. 2002-367142, the coefficient of friction increased with repeated running and the phenomenon of shaving of the surface of the magnetic layer occurred, precluding adequate running durability.

An aspect of the present invention provides for a magnetic tape of multilayer configuration that comprises a nonmagnetic layer and a magnetic layer on a nonmagnetic support and that can exhibit good running durability.

The present inventor conducted extensive research, resulting in the discovery of the following magnetic tape:

A magnetic tape, which comprises a nonmagnetic layer containing nonmagnetic powder and binder on a nonmagnetic support, and comprises a magnetic layer containing ferromagnetic powder and binder on the nonmagnetic layer;

wherein a fatty acid ester, a fatty acid amide, and a fatty acid are contained in either one or both of the magnetic layer and the nonmagnetic layer, with the magnetic layer and nonmagnetic layer each containing at least one selected from the group consisting of a fatty acid ester, a fatty acid amide, and a fatty acid;

the quantity of fatty acid ester per unit area of the magnetic layer in extraction components extracted from the surface of the magnetic layer with n-hexane falls within a range of 1.00 mg/m$^2$ to 10.00 mg/m$^2$; and the weight ratio of the quantity of fatty acid ester per unit area of the magnetic layer to the combined total of the quantity of fatty acid amide and the quantity of fatty acid (quantity of fatty acid ester/(quantity of fatty acid amide+ quantity of fatty acid)) per unit area of the magnetic layer falls within a range of 1.00 to 3.00 in the extraction components. The magnetic tape has the above multilayer configuration. The present inventor presume the reasons for which it can exhibit good running durability to be as follows.

The above extraction components extracted from the surface of the magnetic layer with n-hexane refer to the components that are extracted from a sample in n-hexane by immersing a 5 m sample of magnetic tape cut at any position in the longitudinal direction for 5 minutes in 120 mL of n-hexane. Stirring can be optionally conducted one or multiple times. When the magnetic tape comprises a backcoat layer, as will be described further below, the extraction is conducted after the backcoat layer has been removed from the sample, either before or after cutting the sample. The above operations are conducted at a room temperature of 15° C. to 25° C. without heating the n-hexane.

Subsequently, the n-hexane is evaporated off and the extracted components are qualitatively and quantitatively analyzed by gas chromatography to obtain the various contents of fatty acid ester, fatty acid amide, and fatty acid in the extraction components. The values obtained are divided by the area of the surface of the magnetic layer of the sample to calculate the quantity of fatty acid ester, the quantity of fatty acid amide, and the quantity of fatty acid per unit area of the magnetic layer.

The quantity of fatty acid ester, quantity of fatty acid amide, and quantity of fatty acid per unit area of the magnetic layer that are obtained by the above method are considered by the present inventor to be values that can serve as indicators of the quantities of fatty acid ester, fatty acid amide, and fatty acid that are present on the surface of the magnetic layer during recording on and reproduction from a magnetic tape. This will be described in detail further below. These values will also be referred to hereinafter as the quantity of surface fatty acid ester, the quantity of surface fatty acid amide, and the quantity of surface fatty acid.

The above magnetic tape contains a fatty acid ester, fatty acid amide, and fatty acid in either one of, or both, the magnetic layer and nonmagnetic layer. That is, the fatty acid ester is contained in either one of, or both, the magnetic layer and the nonmagnetic layer. Similarly, the fatty acid amide and fatty acid are each contained in either one of, or both, the magnetic layer and the nonmagnetic layer. In one embodiment, both the magnetic layer and the nonmagnetic layer contain a fatty acid, fatty acid ester, and fatty acid amide. One or more from among the fatty acid, fatty acid ester, and fatty acid amide will be referred to as a "lubricant", hereinafter.

In one embodiment, the weight ratio of the quantity of fatty acid ester per unit area of the magnetic layer to the quantity of fatty acid amide per unit area of the magnetic layer (quantity of fatty acid ester/quantity of fatty acid amide) in the extraction components falls within a range of 5.00 to 20.00.

In one embodiment, the weight ratio of the quantity of fatty acid ester per unit area of the magnetic layer to the quantity of fatty acid per unit area of the magnetic layer in the extraction components (quantity of fatty acid ester/quantity of fatty acid) falls within a range of 1.00 to 6.00.

In one embodiment, the weight ratio of the quantity of fatty acid ester per unit area of the magnetic layer to the quantity of fatty acid amide per unit area of the magnetic layer in the extraction components (quantity of fatty acid ester/quantity of fatty acid amide) falls within a range of 5.00 to 20.00, and the weight ratio of the quantity of fatty acid ester per unit area of the magnetic layer to the quantity of fatty acid per unit area of the magnetic layer (quantity of fatty acid ester/quantity of fatty acid) falls within a range of 1.00 to 6.00.

In one embodiment, the nonmagnetic powder of the nonmagnetic layer contains at least carbon black.

In one embodiment, the nonmagnetic powder of the nonmagnetic layer contains 10.00 to 100.00 weight parts of carbon black per a total quantity of 100.00 weight parts of nonmagnetic powder.

In one embodiment, the thickness of the nonmagnetic layer falls within a range of 0.03 µm to 0.20 µm.

In one embodiment, the magnetic tape is a magnetic tape that is formed by what is called sequential multilayer coating by coating and drying a coating composition for forming a nonmagnetic layer on a nonmagnetic support to form a nonmagnetic layer, and then coating and drying a coating composition for forming the magnetic layer over the nonmagnetic layer.

A further aspect of the present invention relates to a method of manufacturing the above magnetic tape, which comprises:

coating and drying a coating composition for forming a nonmagnetic layer on a nonmagnetic support to form a nonmagnetic layer; and coating and drying a coating composition for forming a magnetic layer on the nonmagnetic layer that has been formed to form a magnetic layer.

An aspect of the present invention can provide a magnetic tape in which an increase in the coefficient of friction with repeated running and the resulting generation of shavings on the surface of the magnetic layer can be inhibited, and thus which can exhibit good running durability.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The magnetic tape of an aspect of the present invention comprises, on a nonmagnetic support, a nonmagnetic layer containing nonmagnetic powder and binder, and on the nonmagnetic layer, a magnetic layer containing ferromagnetic powder and binder, with a fatty acid ester, fatty acid amide, and fatty acid being contained in either one of, or both, the magnetic layer and the nonmagnetic layer; with the magnetic layer and nonmagnetic layer each containing at least one selected from the group consisting of a fatty acid ester, a fatty acid amide, and a fatty acid; with the extraction components extracted from the surface of the magnetic layer by n-hexane comprising a quantity of fatty acid ester per unit area of the magnetic layer falling within a range of 1.0 mg/m$^2$ to 10.00 mg/m$^2$; and with the weight ratio of the quantity of fatty acid ester per unit area of the magnetic layer to the combined quantity of fatty amide and quantity of fatty acid per unit area of the magnetic layer (quantity of fatty acid ester/(quantity of fatty acid amide+quantity of fatty acid)) falling within a range of 1.0 to 3.0.

Although not specifically limiting the present invention, the reasons for which the present inventor assumes that the above magnetic tape having a multilayer configuration sequentially comprising, on a nonmagnetic support, a nonmagnetic layer and a magnetic layer can exhibit good running durability will be given below.

As set forth above, the quantity of lubricant extracted by n-hexane in Japanese Unexamined Patent Publication (KOKAI) No. 2002-367142 is specified per unit area of the magnetic layer as 20 mg/m$^2$ to 1,000 mg/m$^2$. As set forth above, the magnetic tape described in Japanese Unexamined Patent Publication (KOKAI) No. 2002-367142 comprises a single magnetic layer on a nonmagnetic support.

By contrast, in the extensive research conducted by the present inventor, he noted that lubricant tended to seep out less onto the surface of the magnetic layer in magnetic tapes of multilayer configuration than in magnetic tapes of single-layer configuration such as that described in Japanese Unexamined Patent Publication (KOKAI) No. 2002-367142. One reason for the tendency to not seep out is thought to be that in a magnetic tape of multilayer configuration, the layers are dense, with few voids being present within the magnetic layer and nonmagnetic layer due to fabrication that normally includes a calendering treatment to smooth the surface and the like. The fact that a lubricant tends not to move about in dense layers is presumed to be why the lubricant tends not to migrate to the surface of the magnetic layer from the interior of the magnetic layer and tends not to migrate to the surface of the magnetic layer from the nonmagnetic layer. Another reason is thought to be that in a magnetic tape having a single magnetic layer, the migration of lubricant to the surface of the magnetic layer supplies lubricant to the surface of the magnetic layer, while in a magnetic tape of multilayer configuration, less lubricant tends to be supplied to the surface of the magnetic layer than a in magnetic tape having a single magnetic layer because at least a portion of the lubricant that is present on the surface of the magnetic layer is supplied by interlayer migration consisting of lubricant migrating from the nonmagnetic layer to the magnetic layer. In this process, the present inventor assumes that the quantity of fatty acid ester, considered a desirable lubricant in Japanese Unexamined Patent Publication (KOKAI) No. 2002-367142 and widely employed as a lubricant, tends to decrease in a magnetic tape of multilayer configuration relative to in a magnetic tape having a single magnetic layer. The present inventor presumes this to be what invites a drop in running durability in magnetic tapes of multilayer configuration.

Accordingly, the present inventor conducted further extensive research into enhancing the running durability with a small quantity of fatty acid ester present on the surface of the magnetic layer in magnetic tapes with multilayer configurations. As a result, he discovered that by keeping the weight ratio of the quantity of fatty acid ester per unit area of the magnetic layer to the combined quantities of the quantity of fatty acid amide and the quantity of fatty acid per unit area of the magnetic layer in the extraction components extracted by n-hexane to within the above range, it was possible to enhance the running durability. This point will be described in greater detail below.

Lubricants can generally be roughly divided into fluid lubricants and boundary lubricants. Although fatty acid esters are components that can function as fluid lubricants, fatty acid amides and fatty acids are components that can function as boundary lubricants. Boundary lubricants are thought to be capable of lowering the contact friction by adsorbing to the surface of powders (such as ferromagnetic powders) and forming a strong lubricating film. Additionally, fluid lubricants themselves are thought to form liquid films on the surface of the magnetic layer, with friction being reduced by the flowing of this liquid film. On the surface of a magnetic layer in which only a small quantity of fatty acid ester capable of functioning as a liquid lubricant is present, the fact that the thickness of the liquid film cannot be adequately ensured by the fatty acid ester is presumed to increase the coefficient of friction during sliding of the surface of the magnetic layer and the head. That is, the present inventor assumes the decrease in the coefficient of friction-reducing effect by the fatty acid ester to be the cause of the drop in running durability in magnetic tapes of multilayer configuration. By contrast, the present inventor assumes that increasing the ratio of boundary lubricants (fatty acid amides and fatty acids) that are present on the surface of the magnetic layer and which are thought to adsorb to powder and form a strong lubricating film makes it possible to bolster the effect of reducing the coefficient of friction by fatty acid esters and inhibit an increase in the coefficient of friction in a magnetic layer in which only a small quantity of fatty acid ester is present on the surface. Thus, on the surface of a magnetic layer in which only a small quantity of fatty acid ester is present, the lubricant composition that is needed to ensure running durability may differ from that on the surface of a magnetic layer on which a large quantity of fatty acid ester is present. The present inventor presumes that increasing the quantities of fatty acid amide and fatty acid being capable of functioning as boundary lubricants that are present relative to the quantity of fatty acid ester that is present (specifically by controlling the above ranges) can enhance running curability.

However, these are merely presumptions by the present inventor, and are in no way intended to limit the present invention.

The above magnetic tape will be described in greater detail below.

<Lubricant>

(Quantity of Surface Fatty Acid Ester and the Weight Ratio (Quantity of Surface Fatty Acid Ester/(Quantity of Surface Fatty Acid Amide+Quantity of Surface Fatty Acid))

The methods of measuring the quantity of surface fatty acid ester, the quantity of surface fatty acid amide, and the quantity of surface fatty acid are as set forth above. The tendencies of the various above lubricants to seep out onto the surface of the magnetic layer are thought to differ. Accordingly, the present inventor assumes that the quantities added and the ratio of the quantities added to the coating composition (also referred to as the "coating liquid", hereinafter) to form the magnetic layer and the nonmagnetic layer during manufacturing of the magnetic tape may not necessarily reflect the quantities of the various above lubricants that are added and the ratios of the quantities added that are actually present on the surface of the magnetic layer during recording on and reproduction from a magnetic tape. By contrast, the present inventor assumes that the quantity of surface fatty acid ester, the quantity of surface fatty acid amide, the quantity of surface fatty acid, and their weight ratio that are measured by the above method are values that can serve as indicators of the quantities of the various lubricants actually present on the surface of the magnetic layer during recording on and reproduction from a magnetic tape, and the ratios of these quantities. The quantity of fatty acid ester on the surface of the magnetic tape falls within a range of 1.00 mg/m$^2$ to 10.00 mg/m$^2$. Because the magnetic tape has a multilayer configuration comprising a nonmagnetic layer and a magnetic layer, the quantity of fatty acid ester that is present on the surface of the magnetic layer is thought to be smaller than that of a magnetic tape having a single magnetic layer. The present inventor presumes this to be the reason for the quantity of surface fatty acid ester being less than or equal to 10.00 mg/m$^2$. The present inventor conducted extensive research into ways of countering this. As a result, he discovered that specifying the above weight ratio (quantity of surface fatty acid ester/(quantity of surface fatty acid amide+quantity of surface fatty acid)) could prevent an increase in the coefficient of friction on the surface of a magnetic layer exhibiting a quantity of surface fatty acid ester of less than or equal to 10.00 mg/m$^2$. The quantity of surface fatty acid ester is, for example, less than or equal to 8.00 mg/m$^2$, and can be less than or equal to 7.00 mg/m$^2$. To obtain an effect of reducing the coefficient of friction by means of fatty acid ester, the quantity of surface fatty acid ester is set to greater than or equal to 1.00 mg/m$^2$, desirably greater than or equal to 1.50 mg/m$^2$, and preferably, greater than or equal to 2.0 mg/m$^2$.

The weight ratio (quantity of surface fatty acid ester/(quantity of surface fatty acid amide+quantity of surface fatty acid)) is set to less than or equal to 3.00, desirably less than or equal to 2.90, to inhibit an increase in the coefficient of friction on the surface of a magnetic layer exhibiting a quantity of surface fatty acid ester within the above range. A decrease in this weight ratio means an increase in the quantity of fatty acid amide and fatty acid present on the surface of the magnetic layer. However, the presence of extremely large quantities of fatty acid amides and fatty acids on the surface of the magnetic layer relative to fatty acid esters is thought to make it difficult to achieve good effects of the above-described fluid lubricants and boundary lubricants. Accordingly, in the above magnetic tape, the weight ratio (quantity of surface fatty acid ester/(quantity of surface fatty acid amide+quantity of surface fatty acid)) is set to greater than or equal to 1.00. This weight ratio is desirably greater than or equal to 1.50, and preferably, greater than or equal to 2.00.

The various lubricants are thought to be supplied to the surface of the magnetic layer primarily by migration from the interior of the magnetic layer to the surface of the magnetic layer, as well as by migration from the nonmagnetic layer to the magnetic layer and then migration from the interior of the magnetic layer to the surface of the magnetic layer. Generally, the migration of fatty acid amides and fatty acids tends to occur less than that of fatty acid esters and/or the rate of migration tends to be slower. This is presumed to be because, as set forth above, fatty acid amides and fatty acids function as boundary lubricants, and are prone to adsorb to powder contained in the magnetic layer and nonmagnetic layer. Accordingly, one or more means of promoting the migration of fatty acid amides and fatty acids can be optionally adopted to achieve a weight ratio (quantity of surface fatty acid ester/(quantity of surface fatty acid amide+quantity of surface fatty acid)) falling within the above range in a magnetic tape in which the quantity of surface fatty acid ester falls within the above range. A detailed description will be given below.

An example of one means is to adopt sequential multilayer coating as the method of forming the nonmagnetic layer and magnetic layer. The methods of simultaneous multilayer coating and sequential multilayer coating exist as methods of forming a magnetic tape having a nonmagnetic layer and magnetic layer. The sequential multilayer coating has been set forth above. By contrast, in the simultaneous multilayer coating method, while a coating composition for forming the nonmagnetic layer is still wet after having been coated on a nonmagnetic support, a coating composition for forming the magnetic layer is coated and dried to form the nonmagnetic layer and magnetic layer. As set forth further below, a magnetic tape is desirably formed by adding the various lubricants set forth above to both the coating composition for forming the nonmagnetic layer and the coating composition for forming the magnetic layer. In sequential multilayer coating, the coating composition for forming the magnetic layer is coated on the nonmagnetic layer after it has been dried. Lubricant can migrate from the nonmagnetic layer to the magnetic layer by an osmotic effect. In this process, it is thought that the migration of fatty acid amides and fatty acids that tend not to migrate can be promoted. By contrast, in simultaneous multilayer coating, mixing may take place at the surface because the coating composition for forming the magnetic layer is coated on the coating composition for forming the nonmagnetic layer while the latter is still wet. As a result, the above osmotic effect is presumed to decrease or to tend not to occur. Accordingly, the present inventor presumes that adoption of sequential multilayer coating is desirable in terms of the migration of lubricants from the nonmagnetic layer to the magnetic layer, particularly the migration of fatty acid amides and fatty acids. The osmotic effect can be further heightened by increasing the quantity of solvent in the coating composition for forming the magnetic layer. Thus, the formula of the coating composition for forming the magnetic layer is desirably adjusted taking this point into account.

In magnetic tapes formed by sequential multilayer coating, there is less mixing of the nonmagnetic layer and magnetic layer than in magnetic tapes formed by simultaneously multilayer coating. Thus, it is possible to observe the boundary between the nonmagnetic layer and magnetic layer as a boundary between a portion in which particles of ferromagnetic powder are present and a portion in which particles of nonmagnetic particles are present in an SEM image when observing with a scanning electron microscope (SEM) at a magnification of 40,000-fold a cross-section obtained by cutting a magnetic tape. By contrast, in a magnetic tape formed by simultaneous multilayer coating, it is possible to observe an image in which particles of ferromagnetic powder have mixed with particles of nonmagnetic powder at the junction of the magnetic layer and nonmagnetic layer due to mixing at the junction between the nonmagnetic layer and magnetic layer. Accordingly, it is readily possible to determine a magnetic tape that has been formed by sequential multilayer coating from a magnetic tape that has been formed by simultaneously multilayer coating based on whether there is mixing of particles of ferromagnetic powder and particles of nonmagnetic powder at the junction.

In sequential multilayer coating, the solvent in the coating composition for forming the magnetic layer can seep into the nonmagnetic layer until the drying treatment of the coating composition for forming the magnetic layer is implemented. This seepage is also thought to contribute to migration of lubricant in the nonmagnetic layer to the magnetic layer. The thinner the nonmagnetic layer, the more coating composition for forming the magnetic layer can seep into the interior of the nonmagnetic layer, and the greater the migration of lubricant that can be achieved. Accordingly, adjustment of the thickness of the nonmagnetic layer of a magnetic tape that is formed by sequential multilayer coating is another example of the above means. The desirable thickness of the nonmagnetic layer will be described further below.

Further examples of the above means are either decreasing the quantity of curing agents added to the coating composition for forming the nonmagnetic layer or adding no curing agents, or either not subjecting the nonmagnetic layer to a curing treatment or reducing the degree of the curing treatment. In recent years, a crosslinking reaction with a curing agent has been conducted by adding a curing agent (also referred to as a crosslinking agent) such as polyisocyanate to the coating liquids of the magnetic layer and nonmagnetic layer for forming a magnetic tape and conducting a heat treatment. The addition of a curing agent to the coating composition for forming the nonmagnetic layer in sequential multilayer coating and conducting a curing treatment prior to coating the coating composition for forming the magnetic layer are means of preventing swelling of the nonmagnetic layer due to seepage of solvent from the coating composition for forming the magnetic layer and roughening of the junction between the magnetic layer and the nonmagnetic layer. Additionally, subjecting the nonmagnetic layer to such a curing treatment is also conceivable to inhibit seepage of the coating composition for forming the magnetic layer into the nonmagnetic layer. However, as set forth above, this seepage is presumed to promote migration of lubricant from the nonmagnetic layer into the magnetic layer. It is also conceivable here to promote seepage of the coating composition for forming the magnetic layer into the nonmagnetic layer by adopting a means such as not applying a curing treatment such as the above. Because reducing the thickness of the nonmagnetic layer can reduce the absolute quantity of space that swells due to the permeation of solvent, it is desirable to inhibit the above roughening of the junction.

The migration of lubricant from the nonmagnetic layer into the magnetic layer as set forth above is thought to increase the quantity of lubricant supplied to the surface of the magnetic layer. Additionally, the migration of lubricant from the magnetic layer to the nonmagnetic layer is conversely presumed to reduce the quantity of lubricant supplied to the surface of the magnetic layer. Accordingly, it is also desirable to adopt a means of impeding migration of lubricant from the magnetic layer to the nonmagnetic layer. One example is to promote curing of the magnetic layer. Curing (crosslinking) can be promoted by, for example, increasing the quantity of curing agent added to the coating composition for forming the magnetic layer and intensifying the curing treatment (for example, by increasing heating).

Another example of such a means is to inhibit the adsorption to powder by fatty acid amides and fatty acids that tend to adsorb to powder. This can inhibit the accumulation and prevention of migration of fatty acid amides and fatty acids within the layer by adsorption to powder. For example, fatty acids are thought to tend to adsorb to iron oxide that can be employed as a nonmagnetic powder in the nonmagnetic layer. By contrast, carbon black tends to adsorb less to fatty acids than to iron oxide. Accordingly, the quantity of iron oxide that is employed as nonmagnetic powder in the nonmagnetic layer can be reduced, and the quantity of carbon black employed can be increased. Alternatively, it is possible not to use any iron oxide and to make all the nonmagnetic powder in the nonmagnetic layer carbon black. The above are examples of a means of increasing the quantity of fatty acid that is supplied to the surface of the magnetic layer. There is no limitation to powder. It is also possible to adjust the formula of the coating composition for forming the various layers by reducing or not employing components to which fatty acids tend to adsorb and thus promote the migration of fatty acids. For example, it is possible to add compounds that produce free amine groups.

The use of any one, or a combination of two or more, of the means set forth above to obtain a magnetic tape exhibiting the quantity of surface fatty acid esters and weight ratio within the ranges set forth above is desirable. However, the above means are examples. Any magnetic tape exhibiting the quantity of surface fatty acid esters and weight ratio within the ranges set forth above is included in the magnetic tape of an aspect of the present invention, regardless of the means employed to manufacture it.

(Fatty Acid Esters, Fatty Acid Amides, and Fatty Acids)

The magnetic tape contains a fatty acid ester, fatty acid amide, and fatty acid in either one of, or both, the magnetic layer and the nonmagnetic layer. Further, the magnetic layer and the nonmagnetic layer each contain at least one selected from the group consisting of fatty acid esters, fatty acid amides, and fatty acids. As set forth above, fatty acid esters are thought to contribute to reducing the coefficient of friction during sliding of the surface of the magnetic layer and the head by forming a liquid film on the surface of the magnetic layer as a fluid lubricant. Fatty acid amides and fatty acids are both thought to contribute to reducing the coefficient of friction as boundary lubricants. Because the tendency and rate of fatty acid amides and fatty acids to migrate from the magnetic layer to the surface of the magnetic layer and migrate from the nonmagnetic layer to the magnetic layer are thought to differ, the present inventor assumes that the combined use of both can yield stable lubrication performance over an extended period. For example, by adopting a means such as promoting the migration of a fatty acid, which is thought to tend to migrate less and more slowly than a fatty acid amide, it is presumably possible to employ a fatty acid amide and a fatty acid in combination to achieve the effect of a boundary lubricant based on the fatty acid amide supplied to the surface of the magnetic layer by migration over time while initially primarily achieving the effect of a boundary lubricant based on the fatty acid.

Examples of fatty acids that can produce good effects as lubricants on the surface of the magnetic layer are lauric acid, myristic acid, palmitic acid, stearic acid, oleic acid, linoleic acid, linolenic acid, behenic acid, erucic acid, and elaidic acid. Stearic acid, myristic acid, and palmitic acid are desirable, and stearic acid is preferred. Fatty acids can also be incorporated into the magnetic tape in the form of salts such as metal salts.

Examples of fatty acid esters that can produce good effects as lubricants on the surface of the magnetic layer are esters of the various fatty acids set forth above, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Examples of fatty acid amides that can produce good effects as lubricants on the surface of the magnetic layer are amides of various fatty acids, such as amide laurate, amide myristate, amide palmitate, and amide stearate.

For fatty acids and fatty acid derivatives (esters, amides, and the like), the fatty acid derived moiety of a fatty acid derivative desirably has a structure that is identical or similar to that of the fatty acid which is employed together. As an example, when employing stearic acid as a fatty acid, it is desirable to employ a stearic acid ester or amide stearate.

The lubricants described in Japanese Unexamined Patent Publication (KOKAI) No. 2009-96798, which is expressly incorporated herein by reference in its entirety, can also be employed.

It is desirable for the fatty acid ester, fatty acid amide, and fatty acid to be employed in both the magnetic layer and the nonmagnetic layer to achieve good effects as lubricants from each.

The content of lubricant in the coating composition for forming the magnetic layer is, for example, 1.00 weight part to 12.00 weight parts, desirably 2.00 weight parts to 11.00 weight parts, and preferably 6.00 weight parts to 10.00 weight parts, per 100.00 weight parts of ferromagnetic powder. When employing two or more different lubricants in the coating composition for forming the magnetic layer, the content refers to the combined content thereof. Unless specifically stated otherwise, the same applies to the contents of other components in the present Specification.

The content of fatty acid ester in the coating composition for forming the magnetic layer is, for example, 1.50 weight parts to 20.00 weight parts, desirably 1.00 weight parts to 10.00 weight parts, preferably 1.50 weight parts to 8.00 weight parts, per 100.00 weight parts of ferromagnetic powder. The content of fatty acid amide in the coating composition for forming the magnetic layer is, for example, 0.10 weight part to 1.00 weight part, desirably 0.10 weight part to 0.50 weight part, preferably 0.20 to 0.50 weight part, per 100.00 weight parts of ferromagnetic powder. The content of fatty acid in the coating composition for forming the magnetic layer is, for example, 0.10 weight part to 10.00 weight parts, desirably 1.00 weight part to 5.00 weight parts, and preferably, 1.00 weight part to 3.00 weight parts, per 100.00 weight parts of ferromagnetic powder.

The content of lubricant in the coating composition for forming the nonmagnetic layer is, for example, 1.00 weight part to 6.00 weight parts, desirably 1.50 weight parts to 5.50 weight parts, and preferably, 2.0 weight parts to 5.0 weight parts, per 100.00 weight parts of nonmagnetic powder.

The content of fatty acid ester in the coating composition for forming the nonmagnetic layer is, for example, 1.00 weight part to 5.00 weight parts, desirably 1.00 weight part to 4.00 weight parts, and preferably, 1.00 weight part to 2.00 weight parts, per 100.00 weight parts of nonmagnetic powder. The fatty acid amide content in the coating composition for forming the nonmagnetic layer is, for example, 0.10 weight part to 0.40 weight part, desirably 0.10 weight part to 0.30 weight part, and preferably, 0.10 weight part to 0.20 weight part, per 100.00 weight parts of nonmagnetic powder. The content of fatty acid in the coating composition for forming the nonmagnetic layer is, for example, 1.00 weight part to 4.00 weight parts, desirably 1.00 weight part to 3.00 weight parts, and preferably, 1.00 weight part to 2.00 weight parts, per 100.00 weight parts of nonmagnetic powder.

(Weight Ratio of the Quantity of Surface Fatty Acid Ester, Quantity of Surface Fatty Acid Amide, and Quantity of Surface Fatty Acid)

The presumptions of the present inventor regarding the fact that keeping the weight ratio of (quantity of fatty acid ester/(quantity of fatty acid amide+quantity of fatty acid)) to within a range of 1.00 to 3.00 on the surface of a magnetic layer in which the quantity of surface fatty acid ester falls within a range of 1.00 mg/m$^2$ to 10.00 mg/m$^2$ makes it possible to achieve good running durability in a magnetic tape having a nonmagnetic layer and a magnetic layer on a nonmagnetic support are as set forth above. It is desirable for the coefficient of friction during sliding of the surface of the magnetic layer and the head to be lowered even further to achieve even better running durability. From this perspective, the above tape at a minimum desirably satisfies either (1) or (2) below, and preferably satisfies both. The various above weight ratios can be adjusted by adopting one, or combining any two or more, of the means set forth above.
(1) The weight ratio (quantity of fatty acid ester/quantity of fatty acid amide) falls within a range of 5.00 to 20.00, desirably within a range of 7.00 to 20.00, and preferably within a range of 11.45 to 20.00.
(2) The weight ratio (quantity of fatty acid ester/quantity of fatty acid) falls within a range of 1.00 to 6.00, desirably within a range of 1.00 to 5.00, and preferably, within a range of 1.00 to 2.62.

The quantity of surface fatty acid amide desirably falls within a range of 0.20 mg/m$^2$ to 0.60 mg/m$^2$ and the quantity of surface fatty acid, for example, falls within a range of 0.40 mg/m$^2$ to 2.50 mg/m$^2$. However, there is no limitation to these ranges; it suffices for the weight ratio set forth above (quantity of fatty acid ester/(quantity of fatty acid amide+quantity of fatty acid)) to be satisfied, and it is desirable for one or both of weight ratios (1) and (2) to be satisfied. The quantity of the surface fatty acid amide and the quantity of the surface fatty acid ester, by way of example, can be adjusted by adopting one, or any combination of two or more, of the above-described means.

The lubricants contained in the magnetic layer and nonmagnetic layer have been described above. The magnetic layer and the nonmagnetic layer will be described next in greater detail.

<Magnetic Layer>
(Ferromagnetic Powder)

From the perspective of achieving higher density recording, ferromagnetic powder with an average particle size of less than or equal to 50 nm is desirable. From the perspective of magnetization stability, ferromagnetic powder with an average particle size of greater than or equal to 10 nm is desirable.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Hexagonal ferrite powder is a specific example of desirable ferromagnetic powder. From the perspectives of achieving higher density recording and magnetization stability, the average particle size (average plate diameter) of hexagonal ferrite powder desirably ranges from 10 nm to 50 nm, preferably 20 nm to 50 nm. Reference can be made to Japanese Unexamined Patent Publication (KOKAI) No. 2011-216149, paragraphs 0134 to 0136, for details on hexagonal ferrite powder. The content of the above publication is expressly incorporated herein by reference in its entirety.

Ferromagnetic metal powder is also a specific example of desirable ferromagnetic powder. From the perspectives of achieving higher density recording and magnetization stability, the average particle size (average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, for details on ferromagnetic metal powder.

The content (fill rate) of ferromagnetic powder in the magnetic layer desirably falls within a range of 50 to 90 weight percent, preferably within a range of 60 to 90 weight percent. A high fill rate is desirable from the perspective of increasing the recording density.

(Binder)

The magnetic tape of the present invention is a particulate magnetic tape with a magnetic layer, a nonmagnetic layer described further below, and a backcoat layer, optionally provided, that contain binder. The binder employed can be in the form of polyurethane resin, polyester resin, polyamide resin, vinyl chloride resin, styrene, acrylonitrile, methyl methacrylate, and other copolymerized acrylic resins; nitrocellulose and other cellulose resins; epoxy resin; phenoxy resin; polyvinyl acetal, polyvinyl butyral, and other polyvinyl alkyrals; these resins can be employed singly or two or more resins can be mixed for use. Of these, the polyurethane resins, acrylic resins, and vinyl chloride resins are desirable. These resins can also be employed as binders in the nonmagnetic layer and in the backcoat layer, described further below. Reference can be made to Japanese Unexamined Patent Publication (KOKAI) No. 2010-24113, which is expressly incorporated herein by reference in its entirety, paragraphs 0028 to 0031, with regard to the binders. The content of the above publication is expressly incorporated herein by reference in its entirety.

Reference can also be made to the description in Japanese Unexamined Patent Publication (KOKAI) No. 2014-080563, paragraphs 0014 to 0027 and Examples, and to the description in Japanese Unexamined Patent Publication (KOKAI) No. 2013-065381, paragraphs 0012 to 0016 and 0040 to 0136, regarding binder. The contents of the above publications are expressly incorporated herein by reference in their entirety. The quantity of binder, for example, falls within a range of 5.00 weight parts to 50.00 weight parts, desirably within a range of 10.00 weight parts to 30.00 weight parts, per 100.00 weight parts of ferromagnetic powder.

Further, a curing agent can be employed with the above resin. Polyisocyanate is suitable as the curing agent. Reference can be made to Japanese Unexamined Patent Publication (KOKAI) No. 2011-216149, paragraphs 0124 and 0125, for details regarding polyisocyanate. The curing agent can be employed by addition to the coating composition (coating liquid) for forming the magnetic layer in a quantity of, for example, 0.00 to 80.00 weight parts, and for the reasons set forth above, desirably 5.00 to 30.00 weight parts, per 100.00 weight parts of binder.

(Additives)

The magnetic layer contains ferromagnetic powder, lubricant, and binder, and as needed, can contain one or more additives. Examples of additives are nonmagnetic fillers, dispersing agents, dispersion adjuvants, antifungal agents, antistatic agents, and oxidation inhibitors. The additives can be suitably selected for use in the form of commercial products based on the properties desired.

Examples of the additives are described below, but the present invention is not limited to these examples.

(Nonmagnetic Fillers (Nonmagnetic Powder))

One or more nonmagnetic fillers are desirably contained in the magnetic layer. Generally, nonmagnetic powder of high Mohs hardness is suitable as an abrasive. Nonmagnetic powder of lower Mohs hardness than nonmagnetic powder that can function as an abrasive is suitable as a protrusion-forming agent. Protrusion-forming agents are components that can be used to control the surface shape of the magnetic layer to enhance running stability and the like.

Inorganic powder with a Mohs hardness higher than 8 is desirably employed, and inorganic powder with a Mohs hardness greater than or equal to 9 is preferably employed, as an abrasive. The maximum Mohs hardness is the 10 of diamond. Alumina ($Al_2O_3$), silicon carbide, boron carbide ($B_4C$), TiC, cerium oxide, zirconium oxide ($ZrO_2$), and diamond powder are specific examples. Of these, alumina is desirable. Reference can be made to Japanese Unexamined Patent Publication (KOKAI) No. 2013-229090, paragraph 0021, regarding alumina. The content of the above publication is expressly incorporated herein by reference in its entirety. The specific surface area can be employed as an indicator of the particle size of an abrasive. The greater the specific surface area, the smaller the particle size indicated. From the perspective of increasing the smoothness of the surface of the magnetic layer, an abrasive with a specific surface area as measured by the BET method (the BET specific surface area) of greater than or equal to 14 $m^2/g$ is desirable. From the perspective of dispersion, an abrasive with a BET specific surface area of less than or equal to 40 $m^2/g$ is desirably employed. The content of abrasive in the magnetic layer is desirably 1.00 weight part to 20.00 weight parts per 100.00 weight parts of ferromagnetic powder.

Nonmagnetic powder with a Mohs hardness of less than or equal to 8 is desirable as nonmagnetic powder functioning as a protrusion-forming agent. In one embodiment, from the perspective of increasing the smoothness of the surface of the magnetic layer, colloidal particles (nonmagnetic colloidal particles) are desirable. The average primary particle size of nonmagnetic colloidal particles is desirably 50 nm to 200 nm. The average primary particle size of the nonmagnetic colloidal particles in the present invention is the value obtained by the method described in Japanese Unexamined Patent Publication (KOKAI) No. 2011-48878, paragraph 0015. The content of the above publication is expressly incorporated herein by reference in its entirety. Nonmagnetic colloidal particles are desirably in the form of inorganic colloidal particles, preferably in the form of inorganic oxide colloidal particles. From the perspective of ready availability of monodisperse colloidal particles, silica colloidal particles (colloidal silica) are particularly desirable. The Mohs hardness of silica colloidal particles is about 5 to 7. Reference can be made to Japanese Unexamined Patent Publication (KOKAI) No. 2011-48878, paragraph 0023, for retails regarding nonmagnetic colloidal particles. The content of nonmagnetic colloidal particles in the magnetic layer is desirably 0.50 weight part to 5.00 weight parts, preferably 1.00 weight part to 30.00 weight parts, per 100.00 weight parts of ferromagnetic powder.

In another embodiment, carbon black can also be employed as a protrusion-forming agent. Carbon black with an average particle size of, for example, 10 nm to 200 nm, desirably 50 nm to 150 nm, and more preferably, 70 nm to 120 nm can be employed. The carbon black content in the magnetic layer is desirably 0.10 weight part to 5.00 weight parts per 100.00 weight parts of ferromagnetic powder.

(Dispersing Agents)

Generally, the smoother the surface of the magnetic layer, the greater the advantage in achieving higher recording densities. An example of one way of increasing the smoothness of the surface of the magnetic layer is to increase dispersion of the powder in the magnetic layer and in the nonmagnetic layer positioned beneath the magnetic layer. Thus, it is desirable to incorporate one or more dispersing agents in the magnetic layer and in the nonmagnetic layer, described further below. Any known dispersing agent can be employed without limitation. Examples of dispersing agents that can be employed in the magnetic layer and in the nonmagnetic layer, described further below, are the various compounds described in Japanese Unexamined Patent Publication (KOKAI) No. 2009-96798, paragraph 0111. The content of the above publication is expressly incorporated herein by reference in its entirety. Examples of desirable dispersing agents are described below.

—Aromatic Hydrocarbon Compound Having Phenolic Hydroxyl Group—

Dispersing agents can be added to enhance dispersion of powder such as magnetic powder and various nonmagnetic fillers in the magnetic layer. Examples of such dispersing agents are aromatic hydrocarbon compounds having phenolic hydroxyl group(s). The phenolic hydroxyl group referred to here is a hydroxyl group directly bonded to an aromatic ring. Aromatic hydroxyl compounds having phenolic hydroxyl group(s) are desirably dispersing agents for abrasives, preferably for alumina. Reference can be made to the description given in Japanese Unexamined Patent Publication (KOKAI) No. 2013-131285, paragraphs 0012 to 0022, with regard to aromatic hydrocarbon compounds having phenolic hydroxyl group(s). The content of the above publication is expressly incorporated herein by reference in its entirety. One or more aromatic hydrocarbon compounds having phenolic hydroxyl group(s) can be employed. The quantity employed is desirably about 2.00 weight part to 20.00 weight parts per 100.00 weight parts of abrasive, for example. In one embodiment, aromatic hydrocarbon compounds having phenolic hydroxyl group(s) are also desirable as dispersing agents for ferromagnetic powder.

—Polyalkyleneimine Polymer—

(a) Polyalkyleneimine Chain

The term "polyalkyleneimine polymer" refers to a polymer containing one or more polyalkyleneimine chains. In the present invention, the term "polymer" is a polymer comprised of multiple identical or different repeating units, and is used with a meaning that includes both homopolymers and copolymers. The term "polyalkyleneimine chain" refers to a polymerization structure comprising two or more identical or different alkyleneimine chains. Examples of the alkyleneimine chains that are contained are the alkyleneimine chain denoted by formula A below and the alkyleneimine chain denoted by formula B below. Among the alkyleneimine chains denoted by the formulas given below, the alkyleneimine chain denoted by formula A can contain a bond position with another polymer chain. The alkyleneimine chain denoted by formula B can be bonded by means of a salt crosslinking group (described in greater detail further below) to another polymer chain. The polyalkyleneimine chain can have only a linear structure, or can have a branched tertiary amine structure. Examples comprising branched structures are ones where the alkyleneimine chain is bonded to an adjacent alkyleneimine chain at $*^1$ in formula A below and where it is bonded to the adjacent alkyleneimine chain at $*^2$ in formula B below.

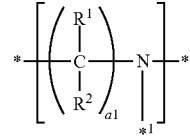

Formula A

In formula A, each of $R^1$ and $R^2$ independently denotes a hydrogen atom or an alkyl group; a1 denotes an integer of equal to or greater than 2; and $*^1$ denotes the site of a bond with an adjacent another polymer chain (such as a polyester chain, an adjacent alkyleneimine chain set forth below), or a hydrogen atom or a substituent.

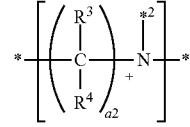

Formula B

In formula B, each of $R^3$ and $R^4$ independently denotes a hydrogen atom or an alkyl group, and a2 denotes an integer of equal to or greater than 2. The alkyleneimine chain denoted by formula B bonds to another polymer chain having an anionic group by $N^+$ in formula B and the anionic group contained in another polymer chain forming a salt crosslinking group.

The * in formulas A and B, and the *² in formula B, each independently denotes the position of a bond with an adjacent alkyleneimine chain, a hydrogen atom or a substituent.

Formulas A and B will be described in greater detail below. In the present invention, unless specifically stated otherwise, the groups that are described can be substituted or unsubstituted. When a given group comprises substituent(s), examples of the substituent are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, and carboxyl groups. For a group having a substituent, the "number of carbon atoms" means the number of carbon atoms of the portion not comprising the substituent.

Each of $R^1$ and $R^2$ in formula A, and each of $R^3$ and $R^4$ in formula B, independently denotes a hydrogen atom or an alkyl group. Examples of the alkyl groups are alkyl groups having 1 to 6 carbon atoms, desirably alkyl groups having 1 to 3 carbon atoms, preferably methyl or ethyl groups, and more preferably, methyl groups. Combinations of $R^1$ and $R^2$ in formula A include an embodiment where one denotes a hydrogen atom and the other denotes an alkyl group, an embodiment where both denote alkyl groups (identical or different alkyl groups), and desirably, an embodiment where both denote hydrogen atoms. The above matters are also applied to $R^3$ and $R^4$ in formula B.

The structure with the fewest carbon atoms constituting the ring in an alkyleneimine is ethyleneimine. The number of carbon atoms on the main chain of the alkyleneimine chain (ethyleneimine chain) obtained by opening the ring of ethyleneimine is 2. Accordingly, the lower limit of a1 in formula A and of a2 in formula B is 2. That is, each of a1 in formula A and a2 in formula B independently denotes an integer of equal to or greater than 2. From the perspective of adsorption to the surface of particles of ferromagnetic powder, each of a1 in formula A and a2 in formula B is independently desirably equal to or less than 10, preferably equal to or less than 6, more preferably equal to or less than 4, still more preferably 2 or 3, and yet still more preferably, 2.

The bond between the alkyleneimine chain denoted by formula A or the alkyleneimine chain denoted by formula B and another polymer chain will be described further below.

Each of the alkyleneimine chains set forth above bonds to an adjacent alkyleneimine chain, a hydrogen atom, or a substituent at the positions denoted by * in the various formulas above. An example of a substituent is a monovalent substituent such as an alkyl group (such as an alkyl group with 1 to 6 carbon atoms), but this is not a limitation. Another polymer chain (such as a polyester chain set forth below) can also be bonded as a substituent.

With regard to the polyalkyleneimine polymer, the present inventors presume that the polyalkyleneimine chain can function as an adsorbing moiety that can adsorb to the surface of the particles of ferromagnetic powder. From the perspective of adsorption to the surface of the particles of ferromagnetic powder, the number average molecular weight of the polyalkyleneimine chain is desirably equal to or higher than 300, and preferably equal to or higher than 500. From the same perspective, it is desirably equal to or lower than 3,000, and preferably equal to or lower than 2,000.

In the present invention, the number average molecular weight of the polyalkyleneimine chain contained in the polyalkyleneimine polymer refers to a value, obtained by gel permeation chromatography (GPC) using standard polystyrene conversion, for the polyalkyleneimine obtained by hydrolyzing the polyalkyleneimine polymer. The value thus obtained is the same as or similar to the value obtained by gel permeation chromatography (GPC) using standard polystyrene conversion for the polyalkyleneimine used to synthesize the polyalkyleneimine polymer. Accordingly, the number average molecular weight obtained for the polyalkyleneimine used to synthesize the polyalkyleneimine polymer can be adopted as the number average molecular weight of the polyalkyleneimine chain contained in the polyalkyleneimine polymer. Reference can be made to Examples set forth further below for the conditions for measuring the number average molecular weight of the polyalkyleneimine chain. Polyalkyleneimine is a polymer that can be obtained by ring-opening polymerization of alkyleneimine.

Further, hydrolysis of the polyalkyleneimine polymer can be conducted by any of the various methods commonly employed as ester hydrolysis methods. For details regarding such methods, for example, reference can be to the description of hydrolysis methods given in "Experimental Chemistry Lecture 14 Synthesis of Organic Compounds II—Alcohols. Amines (5th Ed.)," (compiled by the Chemical Society of Japan, Maruzen Publishing, released August 2005), pp. 95 to 98; and to the description of hydrolysis methods given in "Experimental Chemistry Lecture 16 Synthesis of Organic Compounds IV—Carboxylic Acids.Amino Acids.Peptides (5th Ed.)," (compiled by the Chemical Society of Japan, Maruzen Publishing, released March 2005), pp. 10 to 15, which are expressly incorporated herein by reference in their entirety.

Polyalkyleneimine can be separated from the hydrolysis product thus obtained by known separation means such as liquid chromatography, and the number average molecular weight thereof can be obtained.

From the perspective of enhancing dispersion of ferromagnetic powder, the proportion accounted for by polyalkyleneimine chains in the polyalkyleneimine polymer (also referred to as the "polyalkyleneimine chain ratio", hereinafter) is desirably less than 5.0 weight percent, preferably less than or equal to 4.9 weight percent, more preferably less than or equal to 4.8 weight percent, still more preferably less than or equal to 4.5 weight percent, yet more preferably less than or equal to 4.0 weight percent, and even more preferably, less than or equal to 3.0 weight percent. From the same perspective, the polyalkyleneimine chain ratio is desirably greater than or equal to 0.2 weight percent, preferably greater than or equal to 0.3 weight percent, and more preferably, greater than or equal to 0.5 weight %.

The above proportion accounted for by polyalkyleneimine chains can be controlled, for example, by means of the mixing ratio of polyalkyleneimine and polyester employed during synthesis.

The proportion in the polyalkyleneimine polymer accounted for by the polyalkyleneimine chain can be calculated from the results of analysis by nuclear magnetic resonance (NMR)—more specifically, $^1$H-NMR and $^{13}$C-NMR—and by elemental analysis by known methods. Since the value thus calculated is identical to or similar to the theoretical value obtained from the compounding ratio of the synthesis starting materials of the polyalkyleneimine polymer, the theoretical value obtained from the compounding ratio can be adopted as the proportion in the polyalkyleneimine polymer accounted for by the polyalkyleneimine chain (polyalkyleneimine chain ratio).

(b) Polyester Chain

In addition to the polyalkyleneimine chain set forth above, the polyalkyleneimine polymer desirably comprises another polymer chain(s). Another polymer chain(s) is thought to suppress aggregation between particles of ferromagnetic powder as a steric repulsion chain in the composition for forming a magnetic layer. From this perspective, a desirable example of another polymer chain is a polyester chain. In one embodiment, the alkyleneimine chain denoted by formula A and a polyester chain can form —N—(C=O)— by bonding of the nitrogen atom N in formula A to a carbonyl group —(C=O)— at *$^1$ in formula A. In another embodiment, the alkyleneimine chain denoted by formula B and a polyester chain can form a salt crosslinking group by means of the nitrogen cation N$^+$ in formula B and the anionic group present in a polyester chain. An example of a salt crosslinking group is one formed from the oxygen anion O$^-$ contained in a polyester chain and the N$^+$ contained in formula B. However, this is not intended as a limitation.

The polyester chain denoted by formula 1 below is an example of a polyester chain bonding to the nitrogen atom N contained in formula A by means of a carbonyl bond —(C=O)— to the alkyleneimine chain denoted by formula A. The polyester chain denoted by formula 1 below can bond to the alkyleneimine chain denoted by formula A at the bond position denoted by *$^1$ by the formation of —N—(C=O)— by the nitrogen atom contained in the alkyleneimine chain and the carbonyl group —(C=O)— contained in the polyester chain.

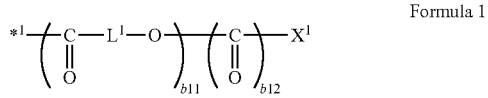

Formula 1

The polyester chain denoted by formula 2 below is an example of a polyester chain that can bond to the alkyleneimine chain denoted by formula B by means of the N$^+$ in formula B and an anionic group contained in the polyester chain forming a salt crosslinking group. In the polyester group denoted by formula 2 below, the oxygen anion O$^-$ and the N$^+$ in formula B can form a salt crosslinking group.

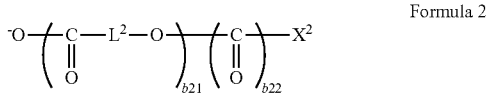

Formula 2

Each of L$^1$ in formula 1 and L$^2$ in formula 2 independently denotes a divalent linking group. A desirable example of a divalent linking group is an alkylene group having 3 to 30 carbon atoms. As set forth above, the number of carbon atoms in an alkylene group refers to the portion (main chain portion) excluding the substituent when the alkylene group comprises a substituent.

Each of b11 in formula 1 and b21 in formula 2 independently denotes an integer of equal to or greater than 2; for example, an integer of equal to or less than 200. The number of repeating lactone units given in Examples further below corresponds to b11 in formula 1 or b21 in formula 2.

Each of b12 in formula 1 and b22 in formula 2 independently denotes 0 or 1.

Each of X$^1$ in formula 1 and X$^2$ in formula 2 independently denotes a hydrogen atom or a monovalent substituent. Examples of monovalent substituents are monovalent substituents selected from the group consisting of alkyl groups, haloalkyl groups (such as fluoroalkyl groups), alkoxy groups, polyalkyleneoxyalkyl groups, and aryl groups.

The alkyl group may be substituted or unsubstituted. An alkyl group substituted with at least one hydroxyl group (a hydroxyalkyl group) and an alkyl group substituted with at least one halogen atom are desirable as a substituted alkyl group. An alkyl group in which all the hydrogen atoms bonded to carbon atoms have been substituted with halogen atoms (a haloalkyl group) is also desirable. Examples of halogen atoms include fluorine, chlorine and bromine atoms. An alkyl group having 1 to 30 carbon atoms is preferred, and an alkyl group having 1 to 10 carbon atoms is of greater preference. The alkyl group can be linear, have a branched chain, or be cyclic. The same applies to a haloalkyl group.

Specific examples of substituted and unsubstituted alkyl groups and haloalkyl groups are: a methyl group, ethyl group, propyl group, butyl group, pentyl group, hexyl group, heptyl group, octyl group, nonyl group, decyl group, undecyl group, dodecyl group, tridecyl group, pentadecyl group, hexadecyl group, heptadecyl group, octadecyl group, eicosyl group, isopropyl group, isobutyl group, isopentyl group, 2-ethylhexyl group, tert-octyl group, 2-hexyldecyl group, cyclohexyl group, cyclopentyl group, cyclohexylmethyl group, octylcyclohexyl group, 2-norbornyl group, 2,2,4-trimethylpentyl group, acetylmethyl group, acetylethyl group, hydroxymethyl group, hydroxyethyl group, hydroxypropyl group, hydroxybutyl group, hydroxypentyl group, hydroxyhexyl group, hydroxyheptyl group, hydroxyoctyl group, hydroxynonyl group, hydroxydecyl group, chloromethyl group, dichloromethyl group, trichloromethyl group, bromomethyl group, 1,1,1,3,3,3-hexafluoroisopropyl group, heptafluoropropyl group, pentadecafluoroheptyl group, nonadecafluorononyl group, hydroxyundecyl group, hydroxydodecyl group, hydroxypentadecyl group, hydroxyheptadecyl group, and hydroxyoctadecyl group.

Examples of alkoxy groups are a methoxy group, ethoxy group, propyloxy group, hexyloxy group, methoxyethoxy group, methoxyethoxyethoxy group, and methoxyethoxyethoxymethyl group.

Polyalkyleneoxyalkyl groups are monovalent substituents denoted by R$^{10}$(OR$^{11}$)n(O)m-. R$^{10}$ denotes an alkyl group, R$^{11}$ denotes an alkylene group, n denotes an integer of equal to or greater than 2, and m denotes 0 or 1.

The alkyl group denoted by R$^{10}$ is as described for the alkyl groups denoted by X$^1$ and X$^2$. The details of the alkylene group denoted by R$^{11}$ are as follows. The above description of the alkyl groups denoted by X$^1$ and X$^2$ can be applied to these alkylene groups by reading alkylenes with one fewer hydrogen atom for the former (for example, by reading "methylene group" for "methyl group"). n denotes an integer of equal to or greater than 2; for example, an integer of equal to or less than 10, desirably equal to or less than 5.

The aryl group can be substituted and can be a condensed ring. It is preferably an aryl group with 6 to 24 carbon atoms, such as a phenyl group, a 4-methylphenyl group, 4-phenylbenzoic acid, a 3-cyanophenyl group, a 2-chlorophenyl group, or a 2-naphthyl group.

The polyester chains denoted by formulas 1 and 2 above can be structures derived from polyesters obtained by known polyester synthesis methods. Lactone ring-opening polymerization is an example of a polyester synthesis method. Examples of lactones are ε-captolactone, δ-caprolactone, β-propiolactone, γ-butyrolactone, δ-valerolactone, γ-valerolactone, enantolactone, β-butyrolactone, γ-hexanolactone, γ-octanolactone, δ-hexanolactone, δ-octanolactone, δ-dodecanolactone, α-methyl-γ-butyrolactone, and lactide. The lactide can be of either the L or D form. In polyester synthesis, it is possible to use one type of lactone, or two types or more of differing structure. ε-lactone, lactides, and δ-valerolactone are desirable as lactones from the perspectives of reactivity and availability. However, there is no limitation thereto. Any lactone yielding polyester by means of ring-opening polymerization will do.

Carboxylic acid, alcohols, and the like can be employed as nucleophilic reagents in lactone ring-opening polymerization. Carboxylic acid is desirable. One type of carboxylic acid or a mixture of two or more types can be employed.

Carboxylic acid can be denoted as $R^{12}(C=O)OH$. The moiety $R^{12}(C=O)$— can be present as the moiety $X^1$—$(C=O)$— in the polyester chain denoted by formula 1. The same applies to the moiety $X^2$—$(C=O)$— on the polyester chain denoted by formula 2.

$R^{12}$ can be acyclic in structure (linear or branched in structure), or can be cyclic in structure. The details of $R^{12}$ are as set forth for $X^1$ in formula 1 and $X^2$ in formula 2 above.

Examples of carboxylic acids are acetic acid, propionic acid, butyric acid, valeric acid, n-hexanoic acid, n-octanoic acid, n-decanoic acid, n-dodecanoic acid, palmitic acid, 2-ethylhexanoic acid, cyclohexanoic acid, stearic acid, glycolic acid, lactic acid, 3-hydroxypropionic acid, 4-hydroxydodecanoic acid, 5-hydroxydodecanoic acid, cyclohexylacetic acid, adamantanecarboxylic acid, adamantaneacetic acid, ricinoleic acid, 12-hydroxydodecanoic acid, 12-hydroxystearic acid, 2,2-bis(hydroxymethyl)butyric acid, [2-(2-methoxyethoxy)ethoxy)]acetic acid, monochloroacetic acid, dichloroacetic acid, bromoacetic acid, nonafluorovaleric acid, heptadecafluorononanoic acid, 3,5,5-trimethylhexanoic acid, acetyl acetic acid, 4-oxovaleric acid, benzoic acid, 4-phenylbenzoic acid, and 2-naphthoic acid. Among these, carboxylic acids with 1 to 20 total carbon atoms per molecule (including the number of carbon atoms of the substituents when present) are desirable. Carboxylic acids in which $R^{12}$ is a polyalkyleneoxyalkyl group (polyalkyleneoxyalkylcarboxylic acids), carboxylic acids in which $R^{12}$ is a haloalkyl group (haloalkylcarboxylic acids), linear aliphatic carboxylic acids having 6 to 20 carbon atoms, and carboxylic acids comprising at least one hydroxyl group with 1 to 20 carbon atoms are preferred.

However, the above polyester chain is not limited to a structure derived from polyester obtained by lactone ring-opening polymerization. It can have a structure derived from polyester obtained by a known polyester synthesis method such as polycondensation of a polyvalent carboxylic acid and polyhydric alcohol or polycondensation of a hydroxycarboxylic acid.

From the perspective of enhancing dispersion of ferromagnetic powder, the number average molecular weight of the polyester chain is desirably greater than or equal to 200, preferably greater than or equal to 400, and more preferably, greater than or equal to 500. From the same perspective, the number average molecular weight of the polyester chain is desirably less than or equal to 100,000, preferably less than or equal to 50,000. The term "number average molecular weight of the polyester chain" refers to a value that is obtained by hydrolyzing the polyalkyleneimine polymer to obtain a polyester, using gel permeation chromatography (GPC), and converting to a standard polystyrene conversion. The value that is thus obtained is identical to or similar to the value that is obtained by subjecting the polyester that is used to synthesize the polyalkyleneimine polymer to gel permeation chromatography (GPC) and converting to a standard polystyrene conversion. Accordingly, the number average molecular weight calculated for the polyester employed to synthesize the polyalkyleneimine polymer can be adopted as the number average molecular weight of the polyester chain contained in the polyalkyleneimine polymer. Reference can be made to the conditions used to measure the number average molecular weight of the polyester in Examples given further below for the conditions used to measure the number average molecular weight of the polyester chain.

(c) Weight Average Molecular Weight of the Polyalkyleneimine Polymer

The molecular weight of the polyalkyleneimine polymer is, for example, greater than or equal to 1,000, and also by way of example, less than or equal to 80,000, as a weight average molecular weight. The weight average molecular weight of the polyalkyleneimine polymer is desirably greater than or equal to 1,500, preferably greater than or equal to 2,000, and more preferably, greater than or equal to 3,000. In one embodiment, the weight average molecular weight of the polyalkyleneimine polymer is desirably less than or equal to 60,000, preferably less than or equal to 40,000, more preferably less than or equal to 35,000, and still more preferably, less than or equal to 34,000.

In the present invention, the term "weight average molecular weight of the polyalkyleneimine polymer" refers to a value that is obtained by gel permeation chromatography (GPC) and converted to the standard styrene conversion. Reference can be made to Examples further below for measurement conditions.

(d) Synthesis Methods

The synthesis method of the polyalkyleneimine polymer is not specifically limited. An example of a desirable embodiment of synthesis method is the method of reacting polyalkyleneimine (referred to as "component A-1", hereinafter) with polyester (referred to as "component A-2", hereinafter).

Component A-1 desirably has a number average molecular weight set forth above for the polyalkyleneimine chain. The details of the measurement method, desirable range, and the like of the number average molecular weight of component A-1 are the same as those set forth for the polyalkyleneimine chain above.

Polyalkyleneimine is a polymer that can be obtained by alkyleneimine ring-opening polymerization, as set forth above. The details of the structure of polyalkyleneimine are as set forth for the polyalkyleneimine chain above.

The same one, two, or more types of different alkyleneimines can be employed as the alkyleneimines yielding polyalkyleneimine by ring-opening polymerization. Details regarding the number of carbon atoms of the alkyleneimine are as set forth above for a1, a2, and a3 in formulas A, B, and C. Alkyleneimines with 2 to 4 carbon atoms are desirably employed. Alkyleneimines with 2 or 3 carbon atoms are preferred. An alkyleneimine with two carbon atoms, that is, ethyleneimine, is of greater preference. The number of carbon atoms in an alkyleneimine refers to the number of carbon atoms in the ring structure.

The polyalkyleneimine employed as component A-1 can be synthesized by known methods or obtained as a commercial product.

Component A-2 is polyester. A polyester chain can be imparted to the polyalkyleneimine polymer by means of component A-2. Details regarding the measurement method, desirable range, and the like of the number average molecular weight of component A-2 are as set forth above for the polyester chain.

Component A-2 can react with the polyalkyleneimine by having one or more functional groups capable of reacting with the polyalkyleneimine. As set forth above, in the polyalkyleneimine polymer thus formed, the polyester chain desirably bonds with the alkyleneimine chain constituting the polyalkyleneimine chain by means of —N—(C=O)— or a salt crosslinking group. To impart such a bond, the functional group of the polyester is desirably in the form of a monovalent acidic group. In this context, the term "acidic group" refers to a group that is capable of dissociating into an anion by releasing $H^+$ in water in a solvent containing water (aqueous solvent). Such groups can form bonds with polyalkyleneimine chains or form salt crosslinking groups. Specific examples are a carboxyl group, sulfonic acid group, phosphoric acid group, and salts thereof. A carboxyl group and carboxyl salt group are desirable. In this context, the form of the salt of a carboxyl group (—COOH) means a carboxyl salt group in which the M in —COOM denotes a cation such as an alkali metal ion. The same applies to the forms of salts of other acidic groups. From the perspective of introducing a polyester chain capable of effectively functioning as a steric repulsion chain, the number of the functional groups contained in component A-2 is desirably 1. From the same perspective, the functional group is desirably incorporated as a terminal functional group in component A-2.

The acidic group has been specified above with regard to water or an aqueous solvent. However, the polyalkyleneimine polymer is not limited to those that can be employed in a water-based (in this context, the term "based" is used to mean "containing") solvent. It can desirably be employed in non-water-based solvents. The solvent contained in the coating composition for various layers such as a magnetic layer, a nonmagnetic layer and a backcoat layer described further below is not limited to water-based solvents. It can be a non-water-based solvent, and is desirably a non-water-based solvent.

Details of the structure of the polyester are as set forth for the polyester chain above. The above-described polyester can be synthesized by known methods or can be obtained as a commercial product. For example, polyester having a terminal functional group in the form of a carboxyl group can be obtained by the method of conducting lactone ring-opening polymerization in the presence of a nucleophilic reagent such as carboxylic acid. With regard to the polyester synthesis conditions, known techniques can be applied without limitation. The polyester having a carboxyl group as a terminal functional group can be bonded with the alkyleneimine chain denoted by formula A by means of —N—(C=O)—. It can also be bonded with the alkyleneimine denoted by formula B by means of the above-described salt crosslinking group. Details such as specific examples of carboxylic acids and the like are as set forth above.

The reaction of above-described components A-1 and A-2 can be conducted by known polymerization methods such as solution polymerization and the like. For example, it can be conducted by stirring and mixing components A-1 and A-2, optionally in the presence of an organic solvent. The reaction can progress without a solvent. For example, a reaction solution containing components A-1 and A-2 can be heated (to a heating temperature of 50° C. to 200° C., for example) while being stirred in air or in a nitrogen atmosphere, or heated (to a heating temperature of 40° C. to 150° C., for example) while adding a catalyst such as an organic tin compound such as monobutyltin oxide, an ammonium salt such as trimethylammonium bromide, a tertiary amine such as benzyldimethylamine, or a quaternary ammonium salt, to conduct the reaction. Examples of organic solvents are ethyl acetate, chloroform, tetrahydrofuran, methyl ethyl ketone, acetone, acetonitrile, and toluene.

(e) Other Polymer Chain

The polyalkyleneimine polymer can comprise one or more polymer chains other than a polyester chain, and can comprise both a polyester chain and a polymer chain other than a polyester chain. The same method as that set forth above for introducing a polyester chain can be used to introduce such a polymer chain into a polyalkyleneimine polymer.

(f) Content of Polyalkyleneimine Polymer

When the magnetic layer contains the above-described polyalkyleneimine polymer, from the perspective of enhancing dispersion of ferromagnetic powder, it is desirable for the content of the polyalkyleneimine polymer in the magnetic layer to be greater than or equal to 0.50 weight part, preferably greater than or equal to 1.00 weight part, per 100.00 weight parts of ferromagnetic powder. From the perspective of high density recording, it is desirable for the content of other components to be relatively low to increase the fill rate of ferromagnetic powder. From this perspective, the content of polyalkyleneimine polymer in the magnetic layer is desirably less than or equal to 50.00 weight parts, preferably less than or equal to 40.00 weight parts, per 100.00 weight parts of ferromagnetic powder. The dispersion of ferromagnetic powder of suitably small particle size for high density recording, such as an average particle size of less than or equal to 50 nm, can be improved by the above polyalkyleneimine polymer.

The above-described magnetic layer is disposed over a nonmagnetic layer on a nonmagnetic support. The nonmagnetic layer and nonmagnetic support will be described in detail further below.

<Nonmagnetic Layer>

The nonmagnetic layer will be described next. The magnetic tape of an aspect of the present invention comprises a nonmagnetic layer containing nonmagnetic powder and binder between a nonmagnetic support and the magnetic layer. The nonmagnetic powder that is employed in the nonmagnetic layer can be an organic or inorganic material. Carbon black can also be used. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraph 0146 to 0150, and Japanese Unexamined Patent Publication (KOKAI) No. 2013-049832, paragraphs 0019 to 0020.

The content of nonmagnetic powder in the nonmagnetic layer desirably falls within a range of 50 to 90 weight percent and preferably falls within a range of 60 to 90 weight percent.

As set forth above, the use of carbon black as nonmagnetic powder in the nonmagnetic layer is an example of one way to adjust the above weight ratio. The nonmagnetic powder in the nonmagnetic layer can comprise, for example, 10.00 weight parts or more of carbon black, or can comprise 20.00 weight parts or more of carbon black, per 100.00 weight parts of the total quantity of nonmagnetic powder. The total quantity of nonmagnetic powder can be carbon black (that is, the above content can be 100.00 weight parts).

The lubricant contained in the nonmagnetic layer is as set forth above.

The binder, dispersing agent, and other additives, solvent, dispersion method, and the like of the magnetic layer can be applied to the nonmagnetic layer. In particular, known techniques relating to the magnetic layer can be applied to the quantity and type of binder, and the quantity and type of additives added, to the nonmagnetic layer. Reference can be made to Japanese Unexamined Patent Publication (KOKAI) No. 2010-24113, paragraphs 0040 to 0042 for examples of components that can be added to the nonmagnetic layer.

Examples of additives in the nonmagnetic layer are additives that can function as dispersing agents to enhance the dispersion of nonmagnetic powder. Examples of such additives are organic tertiary amines. Organic tertiary amines are desirably added to a nonmagnetic layer containing carbon black as nonmagnetic powder. The addition can enhance the dispersion of carbon black. Reference can be made to Japanese Unexamined Patent Publication (KOKAI) No. 2013-049832, paragraphs 0011 to 0018 and 0021 for organic tertiary amines. Reference can also be made to the same publication, paragraphs 0022 to 0024 and 0027, for the formula and the like of a composition for enhancing the dispersion of carbon black by means of organic tertiary amines. The content of the above publication is expressly incorporated herein by reference in its entirety.

<Backcoat Layer>

The magnetic tape of an aspect of the present invention can comprise a backcoat layer on the opposite surface of the nonmagnetic support from the surface on which the magnetic layer is present. The backcoat layer desirably contains carbon black, or carbon black and inorganic powder. The formula of the magnetic layer and nonmagnetic layer can be applied to the binder and various additives for forming the backcoat layer.

In one embodiment, a lubricant can be incorporated into the backcoat layer. Reference can be made to the above description relating to the magnetic layer regarding lubricants that can be added to the backcoat layer. The quantity of lubricant is, for example, 1.00 weight part to 6.00 weight parts, desirably 2.00 weight parts to 5.00 weight parts, and preferably, 2.50 weight parts to 4.50 weight parts, per 100.00 weight parts of the combined content of carbon black and inorganic powder contained in the backcoat layer.

<Nonmagnetic Support>

Details of the nonmagnetic support will be described next. Examples of nonmagnetic supports are known supports such as biaxially stretched polyethylene terephthalate, polyethylene naphthalate, polyamide, polyamide-imide, and aromatic polyamide. Of these, polyethylene terephthalate, polyethylene naphthalate, and polyamide are desirable.

These supports can be subjected to corona discharge, plasma treatment, adhesion-enhancing treatment, heat treatment and the like in advance.

<Thickness of the Various Layers and the Nonmagnetic Support>

The thickness of the nonmagnetic support is desirably 3.00 µm to 80.00 µm, preferably 3.00 µm to 50.00 µm, and more preferably, 3.00 µm to 10.00 µm.

The thickness of the magnetic layer can be optimized based on the saturation magnetization level of the magnetic head employed, the length of the head gap, and the bandwidth of the recording signal. It is desirably 0.01 µm to 0.10 µm, preferably 0.02 µm to 0.09 µm, to achieve higher recording densities. The magnetic layer comprises at least one layer, but can be divided into two or more layers having differing magnetic properties. A configuration relating to known multilayer magnetic layers can be applied.

From the perspective of the means described above, the thickness of the nonmagnetic layer is desirably less than or equal to 0.08 µm, preferably less than or equal to 0.50 µm. The thickness of the nonmagnetic layer is, for example, greater than or equal to 0.02 µm, desirably greater than or equal to 0.03 µm.

The nonmagnetic layer of the magnetic tape in the present invention will include an essentially nonmagnetic layer containing small quantities of ferromagnetic powder, either as impurities or by design, for example, along with nonmagnetic powder. In the present invention, the term "essentially nonmagnetic layer" means a layer in which the residual magnetic flux density is less than or equal to 10 mT, in which the coercive force is less than or equal to 7.96 kA/m (100 Oe), or in which the residual magnetic flux density is less than or equal to 10 mT and the coercive force is less than or equal to 7.96 kA/m (100 Oe). The nonmagnetic layer desirably has neither residual magnetic flux density nor coercive force.

The thickness of the backcoat layer is desirably less than or equal to 0.90 µm, preferably 0.10 µm to 0.70 µm.

The thickness of the various layers and nonmagnetic support of the magnetic tape can be determined by known methods of measuring film thickness. For example, a cross-section in the direction of thickness of the magnetic tape is exposed by a known method such as an ion beam or a microtome, and the exposed cross-section is observed by an scanning electron microscope. The thickness can be variously determined as the thickness in one spot, or the arithmetic average of the thickness determined in two or more spots—for example, two spots—in the direction of thickness. The thicknesses of the various layers can also be calculated from the manufacturing conditions as design thicknesses.

<Process of Manufacturing the Magnetic Tape>

The magnetic tape of an aspect of the present invention is a particulate magnetic tape. It can be manufactured using coating compositions (coating liquids) for forming the various layers, such as a magnetic layer, a nonmagnetic layer, and an optionally provided backcoat layer. Specific embodiments of the process of manufacturing a magnetic tape will be described below. However, the magnetic tape of an aspect of the present invention is not limited to magnetic tapes manufactured by a manufacturing process of the embodiment set forth below.

(Composition for Forming the Magnetic Layer)

The composition (coating liquid) for forming the magnetic layer normally contains solvent in addition to the various components set forth above. Examples of the solvent are the organic solvents generally employed to manufacture magnetic tapes. The content of solvent in the composition for forming the magnetic layer falls, for example, within a range of 100.00 weight parts to 1,200.00 weight parts, desirably within a range of 500.00 weight parts to 1,000.00 weight parts, per 100.00 weight parts of ferromagnetic powder. As set forth above, using a large quantity of solvent is an example of one way to adjust the quantity of surface fatty acid ester and the above weight ratio.

The process of preparing the composition for forming the magnetic layer and the compositions for forming the various layers such as the nonmagnetic layer normally comprises a kneading step, a dispersing step, and mixing steps provided as needed before and after these steps. Each individual step can be divided into two or more substeps. All of the starting materials, such as the ferromagnetic powder, nonmagnetic powder, binder, carbon black, various additives, and solvents, can be added at the outset or part way through any step. The individual starting materials can be divided up and added in two or more steps. In the coating composition for forming the magnetic layer, a dispersion (magnetic liquid) containing ferromagnetic powder, a dispersion (abrasive liquid) containing abrasive, and a dispersion (protrusion-forming agent liquid) containing a protrusion-forming agent are desirably prepared as separate dispersions and then simultaneously or sequentially mixed with other components such as lubricants to prepare the composition for forming the magnetic layer. Part or all of the lubricants, curing agent, and solvent can be added to the mixtures of the magnetic liquid, abrasive liquid, and protrusion-forming agent liquid. Additionally, reference can be made to Japanese Unexamined Patent Publication (KOKAI) No. 2010-231843, paragraph 0065, regarding preparation of coating compositions of various layers. The content of the above publication is expressly incorporated herein by reference in its entirety.

(Composition for Forming the Nonmagnetic Layer and the Composition for Forming the Backcoat Layer)

The nonmagnetic layer can be formed by directly coating, for example, the composition (coating liquid) for forming the nonmagnetic layer on the surface of a nonmagnetic support. The composition for forming the nonmagnetic layer normally contains solvent in addition to the various components set forth above. Examples of the solvent are the organic solvents that are commonly employed in the manufacturing of particulate magnetic tapes. Additionally, reference can be made to the above description of the coating composition for forming the magnetic layer for details about how to prepare the coating composition for forming the nonmagnetic layer.

Reference can be made to the above description regarding the coating composition for forming the magnetic layer with regard to details on preparation of the coating composition (coating liquid) for forming the backcoat layer.

(Coating Step)

The magnetic layer can be formed by multilayer coating the coating composition for forming the magnetic layer and the coating composition for forming the nonmagnetic layer either sequentially or simultaneously. Reference can be made to Japanese Unexamined Patent Publication (KOKAI) No. 2010-231843, paragraph 0066, for details on coatings to form the various layers. As set forth above, in one embodiment, sequential multilayer coating is desirable.

(Other Steps)

Reference can be made to Japanese Unexamined Patent Publication (KOKAI) No. 2010-231843, paragraphs 0067 to 0070, with regard to various other steps in manufacturing a magnetic tape.

The magnetic tape of an aspect of the present invention as set forth above can inhibit both an increase in the coefficient of friction during sliding of the surface of the magnetic layer and the head and a drop in running durability in a magnetic recording and reproduction system of the contact sliding type in which the surface of the magnetic layer and the head come in contact (slide) during signal recording and reproduction.

EXAMPLES

The present invention will be described in detail below based on Examples. However, the present invention is not limited to embodiments shown in Examples. The terms "parts" and "percent" given in Examples are weight parts and weight percent unless otherwise stated. The following operations were conducted at room temperature (about 20° C.).

<Synthesis of Polyalkyleneimine Polymer A>

The acid values and amine values given below were determined by the electrical potential method (solvent: tetrahydrofuran/water=100/10 (volumetric ratio), titration solution: 0.01 N (0.01 mol/L) sodium hydroxide aqueous solution (acid value), 0.01 N (0.01 mol/L) hydrochloric acid (amine value)).

The number average molecular weight and weight average molecular weight were measured by GPC and converted to standard polystyrene conversion values.

The various measurement conditions for the average molecular weight of polyester, polyalkyleneimine, and polyalkyleneimine polymer were as given below.

(Measurement Conditions for Average Molecular Weight of Polyester)

Measurement apparatus: HLC-8220 GPC (made by Tosoh Corp.)

Column: TSKgel Super HZ 2000/TSKgel Super HZ 4000/TSKgel Super HZ-H (made by Tosoh Corp.)

Eluent: Tetrahydrofuran (THF)

Flow rate: 0.35 mL/min

Column temperature: 40° C.

Detector: Differential refractive (RI) detector (Measurement Conditions for Average Molecular Weight of Polyalkyleneimine and Average Molecular Weight of Polyalkyleneimine Polymer)

Measurement apparatus: MX-8320 GPC (made by Tosoh Corp.)

Column: Three TSKgel Super AWM-Hs (made by Tosoh Corp.)

Eluent: N-methyl-2-pyrrolidone (with 10 mM lithium bromide added as additive)

Flow rate: 0.35 mL/min

Column temperature: 40° C.

Detector: RI

The number average molecular weight of the polyalkyleneimine chain can be determined by the following method.

Synthesized polyalkyleneimine polymer is hydrolyzed by an ester hydrolysis method such as the acid hydrolysis method described in "Experimental Chemistry Lecture 16 Synthesis of Organic Compounds IV—Carboxylic Acids.Amino Acids.Peptides (5th Ed.)," (compiled by the Chemical Society of Japan, Maruzen Publishing, released March 2005), on page 11. Polyalkyleneimine is separated by liquid chromatography from the hydrolysis product obtained, and the number average molecular weight measured under the above measurement conditions can be adopted as the number average molecular weight of the polyalkyleneimine contained in the polyalkyleneimine polymer.

(Synthesis of Polyester (i-1))

In a 500 mL, three-necked flask were mixed 16.8 g of carboxylic acid in the form of n-octanoic acid (Wako Pure Chemical Industries, Ltd.), 100 g of lactone in the form of ε-caprolactone (Praxel M made by Daicel Chemical Industries, Inc.), and 2.2 g of catalyst in the form of monobutyltin oxide (Wako Pure Chemical Industries, Ltd.) ($C_4H_9Sn(O)OH$) and the mixture was heated for 1 hour at 160° C. A 100 g quantity of ε-caprolactone was added dropwise over 5 hours and the mixture was stirred for another two hours. Subsequently, the mixture was cooled to room temperature, yielding polyester (i-1).

The synthesis schema is indicated below.

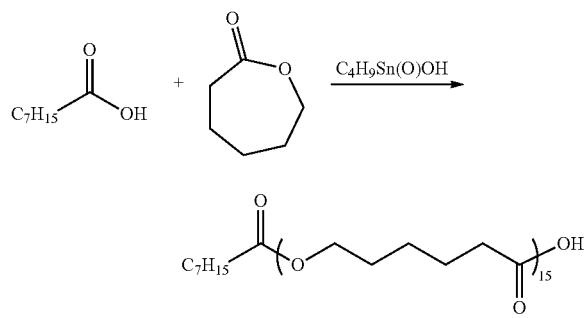

The number average molecular weight and weight average molecular weight of the polyester obtained are given in Table 1 below. The number of units of lactone repeating unit that was calculated from the starting material charge ratio is also given in Table 1.

(Synthesis of Polyalkyleneimine (Polyethyleneimine) Polymer A)

A 2.4 g quantity of polyethyleneimine (SP-006, made by Nippon Shokubai Co., number average molecular weight 600) and 100 g of polyester (i-1) were mixed and heated for 3 hours at 110° C., yielding polyethyleneimine polymer.

Based on the results of two forms of NMR analysis, $^1$H-NMR and $^{13}$C-NMR, and on the results of elemental analysis by the combustion method conducted on the polyalkyleneimine polymer that was obtained, the ratio (polyalkyleneimine chain ratio) accounted for by the polyalkyleneimine chain in the polyalkyleneimine polymer was calculated. The results are given in Table 1. The calculated polyalkyleneimine chain ratio was the same value as the value calculated from the quantities of polyalkyleneimine and polyester charged.

(Fabrication of Magnetic Tape 1 (Example))
Magnetic Layer Coating Liquid (1)

| (Magnetic liquid) | |
|---|---|
| Ferromagnetic barium ferrite powder: (Coercive force Hc: 175 kA/m (2,200 Oe), average particle size: 27 nm) | 100.0 parts |
| Oleic acid: | 1.50 parts |
| Polyalkyleneimine polymer A: | 10.00 parts |
| Vinyl chloride copolymer (MR-104 made by Zeon Corp.): | 10.00 parts |
| Polyester polyurethane (UR-4800, made by Toyobo): | 4.00 parts |
| 2-Butanone: | 424.00 parts |
| Cyclohexanone: | 2,220.0 parts |
| (Abrasive liquid) | |
| α-Alumina (BET specific surface area: 19 m$^2$/g): | 7.50 parts |
| Polyester polyurethane (UR-4800, made by Toyobo): | 0.75 part |
| 2,3-Dihydroxynaphthalene: | 0.75 part |
| Methyl ethyl ketone (2-butanone): | 28.50 parts |
| (Protrusion-forming agent liquid) | |
| Colloidal silica (average particle size: 120 nm): | 1.00 part |
| 2-Butanone: | 4.00 parts |
| (Lubricant and curing agent liquid) | |
| Stearic acid: | 1.50 parts |
| Amide stearate: | 0.15 part |
| Sec-butyl stearate: | 6.00 parts |
| 2-Butanone: | 110.00 parts |
| Cyclohexanone: | 110.00 parts |
| Polyisocyanate (Coronate (Japanese registered trademark) 3041, Nippon Polyurethane Industry Co., Ltd.): | 2.50 parts |

Nonmagnetic Layer Coating Liquid (1)

| Carbon black: | 100.00 parts |
|---|---|
| Average primary particle size: | 0.020 μm |
| DBP oil absorption capacity: | 80 mL/100 g |
| pH: | 8.0 |
| BET specific surface area: | 250 m$^2$/g |
| Volatile component: | 1.5% |

TABLE 1

| Polyester | Carboxylic acid | Quantity of carboxylic acid charged (g) | Lactone | Weight average molecular weight | Number average molecular weight | Number of repeating lactone units |
|---|---|---|---|---|---|---|
| Synthesis of polyester (i-1) | n-octanoic acid | 16.8 | ε-caprolactone | 7,000 | 5,800 | 15 |

| | Quantity of polyethyleneimine charged (g) | Polyalkyleneimine chain (polyethyleneimine chain) ratio | Polyester | Acid value (mgKOH/g) | Amine value (mgKOH/g) | Weight average molecular weight |
|---|---|---|---|---|---|---|
| Synthesis of polyalkyleneimine (polyethyleneimine) polymer | 2.4 | 2.3 | (i-1) | 35.0 | 17.4 | 7,000 |

<Fabrication of Magnetic Tape>

The formulas of the coating compositions (coating liquids) employed to form the various layers in Examples and Comparative Examples are given below. The magnetic tapes of Examples and Comparative Examples were fabricated by the following methods using the coating liquids of the following formulas. Magnetic tapes 1 to 6 are magnetic tapes of Examples. Magnetic tapes 7 to 12 are magnetic tapes of Comparative Examples.

-continued

| Vinyl chloride copolymer (MR-104 made by Zeon Corp.): | 18.60 part |
|---|---|
| Polyether polyurethane: | 11.70 parts |
| Trioctylamine: | 4.00 parts |
| 2-Butanone: | 510.00 parts |
| Cyclohexanone: | 603.00 parts |
| Sec-butyl stearate: | 1.50 parts |

-continued

| | |
|---|---|
| Stearic acid: | 1.50 parts |
| Amide stearate: | 0.15 part |

Backcoat Layer Coating Liquid (1)

| | |
|---|---|
| Carbon black: | 100 parts |
| (average particle size 40 nm, DBP oil absorption capacity 74 cm$^3$/100 g) | |
| Copper phthalocyanine: | 3.00 parts |
| Vinyl chloride copolymer (MR-110 made by Zeon Corp.): | 0.04 part |
| Nitrocellulose: | 31.50 parts |
| Polyester polyether polyurethane resin (UR-8401 made by Toyobo): | 61.60 parts |
| α-Alumina (BET specific surface area: 17 m$^2$/g): | 0.60 part |
| Polyisocyanate (Coronate 3041 made by Nippon Polyurethane Industry Co., Ltd.): | 14.40 parts |
| 2-Butanone: | 1106.00 parts |
| Toluene: | 293.00 parts |
| Cyclohexanone: | 10.00 parts |
| Stearic acid: | 4.00 parts |

The above magnetic liquid was subjected to 30 passes of dispersion treatment with a single pass residence time of 2 minutes and a rotor tip peripheral speed of 10 m/s in a horizontal bead mill disperser using zirconia (ZrO$_2$) beads 0.1 mm in particle diameter (also referred to as "Zr beads" hereinafter) at a bead fill rate of 80%.

The abrasive liquid was mixed with the above components and charged to a horizontal bead mill disperser with Zr beads 0.3 mm in particle diameter. Adjustment was made to a bead volume/(abrasive liquid volume+bead volume) of 80% and a dispersion treatment was conducted in the bead mill for 120 minutes. The processed liquid was removed and subjected to an ultrasonic dispersion and filtration treatment with a flow-type ultrasonic dispersion and filtration device.

The lubricant and curing agent liquid was charged with the magnetic liquid, protrusion-forming agent liquid, and abrasive liquid to a dissolver stirrer and stirred for 30 minutes at a peripheral speed of 10 m/s, subjected to a three-pass treatment at a flow rate of 7.5 kg/min in a flow-type ultrasonic disperser, and filtered with a 1 μm filter to prepare magnetic layer coating liquid (1).

Nonmagnetic layer coating liquid (1) was prepared by the following method.

Excluding the lubricants (stearic acid, amide stearate, and butyl stearate), the above components were kneaded and diluted in an open kneader. Subsequently, the mixture was dispersion treated in a horizontal bead mill disperser. The lubricants were then added and the mixture was stirred and mixed in a dissolver stirrer to prepare the nonmagnetic layer coating liquid.

Backcoat layer coating liquid (1) was prepared by the following method.

Excluding the lubricant (stearic acid) and polyisocyanate, the above components were charged to a dissolver stirrer, stirred for 30 minutes at a peripheral speed of 10 m/s, and then subjected to dispersion processing in a horizontal bead mill disperser. Subsequently, the lubricant (stearic acid) and polyisocyanate were added and the mixture was stirred and mixed in a dissolver stirrer to prepare the backcoat layer coating liquid.

The nonmagnetic layer coating liquid was coated and dried to a thickness of 0.13 μm on an aramid support 3.6 μm in thickness, after which the magnetic layer coating liquid was coated and dried to a thickness of 0.07 μm.

The backcoat layer coating liquid was coated and dried to a thickness of 0.50 μm on the opposite surface of the support from that on which the nonmagnetic layer and magnetic layer had been formed.

Subsequently, a calender treatment (surface smoothing treatment) was conducted at a temperature of 100° C., a linear pressure of 300 kg/cm (294 kN/m), and a speed of 40 m/min with a calender comprised solely of metal rolls. Subsequently, a heat treatment was conducted for 36 hours in a 70° C. environment. Following the heat treatment, the product was slit to ½ inch width to obtain magnetic tape 1.

(Fabrication of Magnetic Tape 2 (Example))
Magnetic Coating Liquid (2)

| (Magnetic liquid) | |
|---|---|
| Ferromagnetic barium ferrite powder: | 100.0 parts |
| (Hc: 175 kA/m (2,200 Oe), average particle size: 27 nm) | |
| Oleic acid: | 1.50 parts |
| Polyalkyleneimine polymer A: | 10.00 parts |
| Vinyl chloride copolymer | 10.00 parts |
| (MR-104 made by Zeon Corp.): | |
| Polyester polyurethane (UR-4800, made by Toyobo): | 4.00 parts |
| 2-Butanone: | 377.00 parts |
| Cyclohexanone: | 220.00 parts |
| (Abrasive liquid) | |
| α-Alumina (BET specific surface area: 19 m$^2$/g): | 6.00 parts |
| Polyester polyurethane (UR-4800, made by Toyobo): | 0.60 part |
| 2,3-Dihydroxynaphthalene: | 0.60 part |
| 2-Butanone: | 22.80 parts |
| (Protrusion-forming agent liquid) | |
| Colloidal silica (average particle size: 120 nm): | 2.30 part |
| 2-Butanone: | 9.20 parts |
| (Lubricant and curing agent liquid) | |
| Stearic acid: | 2.50 parts |
| Amide stearate: | 0.15 part |
| Sec-butyl stearate: | 6.00 parts |
| 2-Butanone: | 110.00 parts |
| Cyclohexanone: | 110.00 parts |
| Polyisocyanate (Coronate 3041, Nippon Polyurethane Industry Co., Ltd.): | 2.50 parts |

Nonmagnetic Layer Coating Liquid (2)

| | |
|---|---|
| Carbon black: | 100.00 parts |
| Average primary particle size: 0.020 μm | |
| DBP oil absorption capacity: 80 mL/100 g | |
| pH: 8.0 | |
| BET specific surface area: 250 m$^2$/g | |
| Volatile component: 1.5% | |
| Vinyl chloride copolymer (MR-104 made by Zeon Corp.): | 18.60 part |
| Polyether polyurethane: | 11.70 parts |
| Trioctylamine: | 4.00 parts |
| 2-Butanone: | 623.00 parts |
| Cyclohexanone: | 687.00 parts |
| Sec-butyl stearate: | 1.50 parts |
| Stearic acid: | 1.50 parts |
| Amide stearate: | 0.15 part |

Backcoat Layer Coating Liquid (2)

| | |
|---|---|
| Carbon black (average particle size 40 nm, DBP oil absorption capacity74 cm$^3$/100 g) | 20.00 parts |
| Iron oxide: | 80.00 parts |
| Surface treatment agent: Al$_2$O$_3$, and SiO$_2$ | |
| Average particle size 0.15 μm | |
| (average main axis length): | |
| Tap density: 0.8 | |

-continued

| | |
|---|---|
| Acicular ratio: | 7 |
| BET specific surface area: | 52 m²/g |
| pH: | 8 |
| DBP oil absorption capacity: | 33 g/100 g |
| Phenylphosphonic acid: | 3.00 parts |
| Vinyl chloride copolymer (MR-104 made by Zeon Corp.): | 11.90 parts |
| Vinyl chloride copolymer (MR-110 made by Zeon Corp.): | 0.40 part |
| Polyether polyurethane: | 7.50 parts |
| α-Alumina (BET specific surface area: 17 m²/g): | 4.60 parts |
| Polyisocyanate (Coronate 3041 made by Nippon Polyurethane Industry Co., Ltd.): | 5.00 parts |
| 2-Butanone: | 324.00 parts |
| Toluene: | 2.50 parts |
| Cyclohexanone: | 262.00 parts |
| Stearic acid: | 1.00 part |

Magnetic layer coating liquid (2) of the formula set forth above was prepared by the same method as magnetic layer coating liquid (1).

Nonmagnetic layer coating liquid (2) of the formula set forth above was prepared by the same method as nonmagnetic layer coating liquid (1).

Backcoat layer coating liquid (2) of the above formula was prepared by the same method as backcoat layer coating liquid (1).

The nonmagnetic layer coating liquid was coated and dried to a thickness of 0.16 jam on an aramid support 3.6 μm in thickness. The magnetic layer and backcoat layer were then formed by the same methods as in the fabrication of Magnetic Tape 1 and the product was slit to ½ inch width to obtain Magnetic Tape 2.

(Fabrication of Magnetic Tape 3 (Example))
Magnetic Layer Coating Liquid (3)

| (Magnetic liquid) | |
|---|---|
| Ferromagnetic barium ferrite powder: | 100.0 parts |
| (Hc: 175 kA/m (2,200 Oe), average particle size: 27 nm) | |
| Oleic acid: | 1.50 parts |
| Vinyl chloride copolymer | 12.50 parts |
| (MR-104 made by Zeon Corp.): | |
| Polyester polyurethane (UR-4800, made by Toyobo): | 5.00 parts |
| 2-Butanone: | 421.00 parts |
| Cyclohexanone: | 220.00 parts |
| (Abrasive liquid) | |
| α-Alumina (BET specific surface area: 19 m²/g): | 7.50 parts |
| Polyester polyurethane (UR-4800, made by Toyobo): | 0.75 part |
| 2,3-Dihydroxynaphthalene: | 0.75 part |
| 2-Butanone: | 28.50 parts |
| (Protrusion-forming agent liquid) | |
| Colloidal silica (average particle size: 120 nm): | 1.00 part |
| 2-Butanone: | 4.00 parts |
| (Lubricant and curing agent liquid) | |
| Stearic acid: | 1.50 parts |
| Amide stearate: | 0.15 part |
| Sec-butyl stearate: | 6.00 parts |
| 2-Butanone: | 110.00 parts |
| Cyclohexanone: | 110.00 parts |
| Polyisocyanate (Coronate 3041, Nippon Polyurethane Industry Co., Ltd.): | 2.50 parts |

Magnetic layer coating liquid (3) of the formula set forth above was prepared by the same method as magnetic layer coating liquid (1).

Nonmagnetic layer coating liquid (2) was employed as the nonmagnetic layer coating liquid.

Backcoat layer coating liquid (1) was employed as the backcoat layer coating liquid.

The nonmagnetic layer coating liquid was coated and dried to a thickness of 0.16 μm on an aramid support 3.6 μm in thickness. The magnetic layer and backcoat layer were then formed by the same methods as in the fabrication of Magnetic Tape 1 and the product was slit to ½ inch width to obtain Magnetic Tape 3.

(Fabrication of Magnetic Tape 4 (Example))

Magnetic layer coating liquid (1) was employed as the magnetic layer coating liquid.

Nonmagnetic layer coating liquid (2) was employed as the nonmagnetic layer coating liquid.

Backcoat layer coating liquid (1) was employed as the backcoat layer coating liquid.

The nonmagnetic layer coating liquid was coated and dried to a thickness of 0.16 μm on a polyethylene terephthalate (PET) support 5.0 μm in thickness. The magnetic layer and backcoat layer were then formed by the same methods as in the fabrication of Magnetic Tape 1 and the product was slit to ½ inch width to obtain Magnetic Tape 4.

(Fabrication of Magnetic Tape 5 (Example))
Magnetic Layer Coating Liquid (4)

| (Magnetic liquid) | |
|---|---|
| Ferromagnetic barium ferrite powder: | 100.0 parts |
| (Coercivity Hc: 175 kA/m (2,200 Oe), average particle size: 27 nm) | |
| Oleic acid: | 1.50 parts |
| Vinyl chloride copolymer | 10.00 parts |
| (MR-104 made by Zeon Corp.): | |
| Polyester polyurethane (UR-4800, made by Toyobo): | 4.30 parts |
| 2-Butanone: | 365.00 parts |
| Cyclohexanone: | 220.0 parts |
| (Abrasive liquid) | |
| α-Alumina (BET specific surface area: 19 m²/g): | 12.50 parts |
| Polyester polyurethane (UR-4800, made by Toyobo): | 1.25 parts |
| 2,3-Dihydroxynaphthalene: | 1.25 parts |
| 2-Butanone: | 47.50 parts |
| (Protrusion-forming agent liquid) | |
| Colloidal silica (average particle size: 120 nm): | 2.30 parts |
| 2-Butanone: | 9.20 parts |
| (Lubricant and curing agent liquid) | |
| Stearic acid: | 1.50 parts |
| Amide stearate: | 0.15 part |
| Sec-butyl stearate: | 6.00 parts |
| 2-Butanone: | 110.00 parts |
| Cyclohexanone: | 110.00 parts |
| Polyisocyanate (Coronate 3041, Nippon Polyurethane Industry Co., Ltd.): | 2.50 parts |

Nonmagnetic Layer Coating Liquid (3)

| | | |
|---|---|---|
| Carbon black: | | 25.00 parts |
| Average primary particle size: | 0.020 μm | |
| DBP oil absorption capacity: | 80 mL/100 g | |
| pH: | 8.0 | |
| BET specific surface area: | 250 m²/g | |
| Volatile component: | 1.5% | |
| Iron oxide: | | 75.00 parts |
| Surface treatment agent: | Al₂O₃, and SiO₂ | |
| Average particle size (average main axis length): | 0.15 μm | |
| Tap density: | 0.8 | |
| Acicular ratio: | 7 | |
| BET specific surface area: | 52 m²/g | |
| pH: | 8 | |
| DBP oil absorption capacity: | 33 g/100 g | |
| Vinyl chloride copolymer (MR-104 made by Zeon Corp.): | | 11.90 parts |
| Polyether polyurethane: | | 7.50 parts |

-continued

| | |
|---|---|
| Phenylphosphonic acid: | 3.00 parts |
| 2-Butanone: | 409.00 parts |
| Cyclohexanone: | 396.00 parts |
| Sec-butyl stearate: | 1.50 parts |
| Stearic acid: | 1.50 parts |
| Amide stearate: | 0.15 part |

Magnetic layer coating liquid (4) of the above formula was prepared by the same method as magnetic layer coating liquid (1).

Nonmagnetic coating liquid (3) of the above formula was prepared by the same method as nonmagnetic layer coating liquid (1).

Backcoat layer coating liquid (2) was employed as the backcoat layer coating liquid.

The nonmagnetic layer coating liquid was coated and dried to a thickness of 0.16 μm on an aramid support 3.6 μm in thickness. The magnetic layer and backcoat layer were then formed by the same methods as in the fabrication of Magnetic Tape 1 and the product was slit to ½ inch width to obtain Magnetic Tape 5.

(Fabrication of Magnetic Tape 6 (Example))

Magnetic Layer Coating Liquid (5)

| (Magnetic liquid) | |
|---|---|
| Ferromagnetic barium ferrite powder: | 100.0 parts |
| (Coercive force Hc: 175 kA/m (2,200 Oe), | |
| average particle size: 27 nm) | |
| Oleic acid: | 1.50 parts |
| Vinyl chloride copolymer | 10.00 parts |
| (MR-104 made by Zeon Corp.): | |
| Polyester polyurethane (UR-4800, made by Toyobo): | 4.00 parts |
| 2-Butanone: | 365.00 parts |
| Cyclohexanone: | 220.00 parts |
| (Abrasive liquid) | |
| α-Alumina (BET specific surface area: 19 m$^2$/g): | 4.50 parts |
| 2-Butanone: | 17.10 parts |
| (Protrusion-forming agent liquid) | |
| Carbon black (average particle size: 0.08 μm): | 0.50 part |
| 2-Butanone: | 9.20 parts |
| (Lubricant and curing agent liquid) | |
| Stearic acid: | 0.50 parts |
| Amide stearate: | 0.15 part |
| Sec-butyl stearate: | 1.50 parts |
| 2-Butanone: | 110.00 parts |
| Cyclohexanone: | 110.00 parts |
| Polyisocyanate (Coronate 3041, Nippon Polyurethane Industry Co., Ltd.): | 2.50 parts |

Magnetic layer coating liquid (5) of the above formula was fabricated by the same method as magnetic layer coating liquid (1).

Nonmagnetic layer coating liquid (3) was employed as the nonmagnetic coating layer.

Backcoat layer coating liquid (2) was employed as the backcoat layer coating liquid.

The nonmagnetic layer coating liquid was coated and dried to a thickness of 0.70 μm on a PET support 5.0 μm in thickness. The magnetic layer and backcoat layer were then formed by the same methods as in the fabrication of Magnetic Tape 1 and the product was slit to ½ inch width to prepare Magnetic Tape 6.

(Fabrication of Magnetic Tape 7 (Comparative Example))

Magnetic Layer Coating Liquid (6)

| (Magnetic liquid) | |
|---|---|
| Ferromagnetic barium ferrite powder: | 100.0 parts |
| (Coercive force Hc: 175 kA/m (2,200 Oe), | |
| average particle size: 27 nm) | |
| Oleic acid: | 1.50 parts |
| 2.3-Dihydroxynaphthalene: | 6.00 parts |
| Trioctylamine: | 0.60 part |
| Vinyl chloride copolymer | 10.00 parts |
| (MR-104 made by Zeon Corp.): | |
| Polyester polyurethane (UR-4800, made by Toyobo): | 4.00 parts |
| 2-Butanone: | 424.00 parts |
| Cyclohexanone: | 222.0 parts |
| (Abrasive liquid) | |
| α-Alumina (BET specific surface area: 19 m$^2$/g): | 7.50 parts |
| Polyester polyurethane (UR-4800, made by Toyobo): | 0.75 part |
| 2,3-Dihydroxynaphthalene | 0.75 part |
| 2-Butanone: | 28.50 parts |
| (Protrusion-forming agent liquid) | |
| Colloidal silica (average particle size: 120 nm): | 1.00 part |
| 2-Butanone: | 4.00 parts |
| (Lubricant and curing agent liquid) | |
| Stearic acid: | 1.50 parts |
| Amide stearate: | 0.15 part |
| Sec-butyl stearate: | 6.00 parts |
| 2-Butanone: | 110.00 parts |
| Cyclohexanone: | 110.00 parts |
| Polyisocyanate (Coronate 3041, Nippon Polyurethane Industry Co., Ltd.): | 2.50 parts |

Magnetic layer coating liquid (6) of the above formula was fabricated by the same method as magnetic layer coating liquid (1).

Nonmagnetic layer coating liquid (1) was employed as the nonmagnetic layer coating liquid.

Backcoat layer coating liquid (1) was employed as the backcoat layer coating liquid.

The nonmagnetic layer coating liquid was coated and dried to a thickness of 0.13 μm on a PET support 5.0 μm in thickness. The magnetic layer and backcoat layer were then formed by the same methods as in the fabrication of Magnetic Tape 1 and the product was slit to ½ inch width to obtain Magnetic Tape 7.

(Fabrication of Magnetic Tape 8 (Comparative Example))

Magnetic Layer Coating Liquid (7)

| (Magnetic liquid) | |
|---|---|
| Ferromagnetic barium ferrite powder: | 100.0 parts |
| (Hc: 175 kA/m (2,200 Oe), | |
| average particle size: 27 nm) | |
| Oleic acid: | 1.50 parts |
| 2.3-Dihydroxynaphthalene: | 6.00 parts |
| Vinyl chloride copolymer | 10 parts |
| (MR-104 made by Zeon Corp.): | |
| Polyester polyurethane (UR-4800, made by Toyobo): | 4.00 parts |
| 2-Butanone: | 424.00 parts |
| Cyclohexanone: | 222.0 parts |
| (Abrasive liquid) | |
| α-Alumina (BET specific surface area: 19 m$^2$/g): | 7.50 parts |
| Polyester polyurethane (UR-4800, made by Toyobo): | 0.75 part |
| 2,3-Dihydroxynaphthalene | 0.75 part |
| 2-Butanone: | 28.50 parts |
| (Protrusion-forming agent liquid) | |
| Colloidal silica (average particle size: 120 nm): | 1.00 part |
| 2-Butanone: | 4.00 part |

-continued

| (Lubricant and curing agent liquid) | |
|---|---|
| Stearic acid: | 1.50 parts |
| Amide stearate: | 0.15 part |
| Sec-butyl stearate: | 6.00 parts |
| 2-Butanone: | 110.00 parts |
| Cyclohexanone: | 110.00 parts |
| Polyisocyanate (Coronate 3041 made by Nippon Polyurethane Industry Co., Ltd.): | 2.50 parts |

Nonmagnetic Layer Coating Liquid (4)

| Carbon black: | | 100.00 parts |
|---|---|---|
| Average primary particle size: | 0.020 µm | |
| DBP oil absorption capacity: | 80 mL/100 g | |
| pH: | 8.0 | |
| BET specific surface area: | 250 m$^2$/g | |
| Volatile component: | 1.5% | |
| Vinyl chloride copolymer (MR-104 made by Zeon Corp.): | | 18.60 parts |
| Polyether polyurethane: | | 11.70 parts |
| Trioctylamine: | | 6.00 parts |
| 2-Butanone: | | 510.00 parts |
| Cyclohexanone: | | 603.00 parts |
| Sec-butyl stearate: | | 1.50 parts |
| Stearic acid: | | 1.50 parts |
| Amide stearate: | | 0.15 part |

Magnetic layer coating liquid (7) of the above formula was fabricated by the same method as magnetic layer coating liquid (1).

Nonmagnetic layer coating liquid (4) of the above formula was fabricated by the same method as nonmagnetic layer coating liquid (1).

Backcoat layer coating liquid (1) was employed as the backcoat layer coating liquid.

The nonmagnetic layer coating liquid was coated and dried to a thickness of 0.13 µm on a PET support 5.0 µm in thickness. The magnetic layer and the backcoat layer were then formed by the same methods as in fabrication of Magnetic Tape 1 and the product was slit to ½ inch width to obtain Magnetic Tape 8.

(Fabrication of Magnetic Tape 9 (Comparative Example))
Nonmagnetic Layer Coating Liquid (5)

| Carbon black: | | 100.00 parts |
|---|---|---|
| Average particle size: | 0.020 µm | |
| DBP oil absorption capacity: | 80 mL/100 g | |
| pH: | 8.0 | |
| BET specific surface area: | 250 m$^2$/g | |
| Volatile component: | 1.5% | |
| Vinyl chloride copolymer (MR-104 made by Zeon Corp.): | | 18.60 parts |
| Polyether polyurethane: | | 11.70 parts |
| Trioctylamine: | | 6.00 parts |
| 2-Butanone: | | 510.00 parts |
| Cyclohexanone: | | 603.00 parts |
| Sec-butyl stearate: | | 1.50 parts |
| Stearic acid: | | 1.50 parts |
| Amide stearate: | | 0.15 part |

Magnetic layer coating liquid (7) was employed as the magnetic layer coating liquid.

Nonmagnetic layer coating liquid (5) of the above formula was fabricated by the same method as nonmagnetic layer coating liquid (1).

Backcoat layer coating liquid (1) was employed as the backcoat layer coating liquid.

The nonmagnetic layer coating liquid was coated and dried to a thickness of 0.13 µm on a PET support 5.0 µm in thickness. The magnetic layer and the backcoat layer were then formed by the same methods as in fabrication of Magnetic Tape 1 and the product was slit to ½ inch width to obtain Magnetic Tape 9.

(Fabrication of Magnetic Tape 10 (Comparative Example))
Nonmagnetic Layer Coating Liquid (6)

| Carbon black: | | 100.00 parts |
|---|---|---|
| Average particle size: | 0.020 µm | |
| DBP oil absorption capacity: | 80 mL/100 g | |
| pH: | 8.0 | |
| BET specific surface area: | 250 m$^2$/g | |
| Volatile component: | 1.5% | |
| Vinyl chloride copolymer (MR-104 made by Zeon Corp.): | | 18.60 parts |
| Polyether polyurethane: | | 11.7 parts |
| Azo dispersing agent (a solid purified by the method described in Example 1 of Japanese Unexamined Patent Publication (KOKAI) No. 2014-009344, which is expressly incorporated herein by reference in its entirety, from Kayacel (Japanese registered trademark) Yellow CG made by Nippon Kayaku Co., Ltd.) | | 4.00 parts |
| 2-Butanone: | | 510.00 parts |
| Cyclohexanone: | | 603.00 parts |
| Sec-butyl stearate: | | 1.50 parts |
| Stearic acid: | | 1.50 parts |
| Amide stearate: | | 0.15 part |

Magnetic layer coating liquid (7) was employed as the magnetic layer coating liquid.

Nonmagnetic layer coating liquid (6) of the above formula was fabricated by the same method as nonmagnetic layer coating liquid (1).

Backcoat layer coating liquid (1) was employed as the backcoat layer coating liquid.

The nonmagnetic layer coating liquid was coated and dried to a thickness of 0.13 µm on a PET support 5.0 µm in thickness. The magnetic layer and the backcoat layer were then formed by the same methods as in fabrication of Magnetic Tape 1 and the product was slit to ½ inch width to obtain Magnetic Tape 10.

(Fabrication of Magnetic Tape 11 (Comparative Example))
Nonmagnetic Layer Coating Liquid (7)

| Carbon black: | | 100.00 parts |
|---|---|---|
| Average particle size: | 0.020 µm | |
| DBP oil absorption capacity: | 80 mL/100 g | |
| pH: | 8.0 | |
| BET specific surface area: | 250 m$^2$/g | |
| Volatile component: | 1.5% | |
| Vinyl chloride copolymer (MR-104 made by Zeon Corp.): | | 18.60 parts |
| Polyether polyurethane: | | 11.70 parts |
| Copper phthalocyanine (Solsperse 5000 made by Nippon Lubrizol Corp.): | | 4.00 parts |
| 2-Butanone: | | 510.00 parts |
| Cyclohexanone: | | 603.00 parts |
| Sec-butyl stearate: | | 1.50 parts |
| Stearic acid: | | 1.50 parts |
| Amide stearate: | | 0.15 part |

Magnetic layer coating liquid (7) was employed as the magnetic layer coating liquid.

Nonmagnetic layer coating liquid (7) of the above formula was fabricated by the same method as nonmagnetic layer coating liquid (1).

Backcoat layer coating liquid (1) was employed as the backcoat layer coating liquid.

The nonmagnetic layer coating liquid was coated and dried to a thickness of 0.13 μm on a PET support 5.0 μm in thickness. The magnetic layer and the backcoat layer were then formed by the same methods as in fabrication of Magnetic Tape 1 and the product was slit to ½ inch width to obtain Magnetic Tape 11.

(Fabrication of Magnetic Tape 12 (Comparative Example))

Magnetic Layer Coating Liquid (8)

| (Magnetic liquid) | |
|---|---|
| Ferromagnetic barium ferrite powder: (Hc: 175 kA/m (2,200 Oe), average particle size: 27 nm) | 100.0 parts |
| Oleic acid: | 1.50 parts |
| 2.3-Dihydroxynaphthalene: | 6.00 parts |
| Trioctylamine: | 0.60 part |
| Vinyl chloride copolymer (MR-104 made by Zeon Corp.): | 10.00 parts |
| Polyester polyurethane (UR-4800, made by Toyobo): | 4.00 parts |
| 2-Butanone: | 424.00 parts |
| Cyclohexanone: | 222.0 parts |
| (Abrasive liquid) | |
| α-Alumina (BET specific surface area: 19 m²/g): | 7.50 parts |
| Polyester polyurethane (UR-4800, made by Toyobo): | 0.75 part |
| 2,3-Dihydroxynaphthalene | 0.75 part |
| 2-Butanone: | 28.50 parts |
| (Protrusion-forming agent liquid) | |
| Colloidal silica (average particle size: 120 nm): | 1.00 part |
| 2-Butanone: | 4.00 parts |
| (Lubricant and curing agent liquid) | |
| Stearic acid: | 1.50 parts |
| Amide stearate: | 0.15 part |
| 2-Butanone: | 110.00 parts |
| Cyclohexanone: | 110.00 parts |
| Polyisocyanate (Coronate 3041 made by Nippon Polyurethane Industry Co., Ltd.): | 2.50 parts |

Nonmagnetic Layer Coating Liquid (8)

| Carbon black: | | 100.00 parts |
|---|---|---|
| Average particle size: | 0.020 μm | |
| DBP oil absorption capacity: | 80 mL/100 g | |
| pH: | 8.0 | |
| BET specific surface area: | 250 m²/g | |
| Volatile component: | 1.5% | |
| Vinyl chloride copolymer (MR-104 made by Zeon Corp.): | | 18.60 parts |
| Polyether polyurethane: | | 11.70 parts |
| Trioctylamine: | | 4.00 parts |
| 2-Butanone: | | 510.00 parts |
| Cyclohexanone: | | 603.00 parts |
| Stearic acid: | | 1.50 parts |
| Amide stearate: | | 0.15 part |

Magnetic layer coating liquid (8) of the above formula was fabricated by the same method as magnetic layer coating liquid (1).

Nonmagnetic layer coating liquid (8) of the above formula was fabricated by the same method as nonmagnetic layer coating liquid (1).

Backcoat layer coating liquid (1) was employed as the backcoat layer coating liquid.

The nonmagnetic layer coating liquid was coated and dried to a thickness of 0.13 μm on a PET support 5.0 μm in thickness. The magnetic layer and the backcoat layer were then formed by the same methods as in fabrication of Magnetic Tape 1 and the product was slit to ½ inch width to obtain Magnetic Tape 12.

<Evaluation of Magnetic Tapes>

(Quantity of Surface Fatty Acid Ester, Quantity of Surface Fatty Acid Amide, Quantity of Surface Fatty Acid, Weight Ratio)

The backcoat layer of each of the magnetic tapes fabricated was wiped off with a nonwoven wiper (Bemcot, product of Asahi Kasei) that had been soaked in cyclohexanone. The wiping operation was conducted until no more of the black material derived from the backcoat layer adhered to the nonwoven wiper, at which point a 5 m cut was made in the longitudinal direction of the tape to obtain a tape sample.

The tape sample obtained was placed in a beaker, 120 mL of n-hexane was introduced into the beaker, and a lid was placed on the beaker.

The tape sample was immersed in n-hexane for 5 minutes. Following the introduction of the n-hexane, the beaker was shaken by hand for 30 seconds each time at minute 1 and minute 4 to stir the n-hexane within the beaker.

Following 5 minutes of immersion, the n-hexane in the conical beaker was charged with a 100 mL graduated cylinder to a weighed beaker, the beaker was placed in a draft, and the n-hexane was evaporated.

Subsequently, n-hexane was placed in the beaker and the fatty acid, fatty acid ester, and fatty acid amide were detected under the measurement conditions indicated below by gas chromatography. They were quantified by a calibration curve that had been prepared in advance. Based on the measurement values, the quantity of surface fatty acid ester, the quantity of surface fatty acid amide, the quantity of surface fatty acid, and the various weight ratios were determined. The fact that butyl stearate, stearic acid, and amide stearate were contained in the extracted components was confirmed by the positions of the peaks of the gas chromatography. The oleic acid was not detected. This was thought to have occurred because the oleic acid acted as a ferromagnetic powder dispersing agent in the magnetic layer, adsorbing to the surface of the ferromagnetic powder.

(Measurement Conditions)
Device: GC-17A made by Shimadzu Corp.
Column: DB-1
Column temperature: 50° C.
Inlet temperature: 250° C.
Detector temperature: 250° C.
Column temperature increase program: 50° C./5 minutes→10° C./1 minute temperature rise to 250° C.→250° C./10 minutes
Detector: GC-17A made by Shimadzu Corp.
Column: DB-5MS made by Agilent Technologies (30 m×0.25 mm×0.25 μm)
Column temperature: 40° C.
Sample vaporization chamber temperature: 100° C.
Detector partial temperature: 250° C.
Quantity of sample injected: 1 μL
Temperature rate: 40° C./6 min→temperature raised to 30° C./min→210° C./8 min (Evaluation of Running Durability)

A 300 m length of tape was run back and forth 7,500 times at a running speed of 6 m/s and the magnetic tape was caused to slide against the head.

The surface of the magnetic layer of the magnetic tape following sliding was observed at 200-fold magnification with an optical microscope and the surface of the magnetic tape was observed for scratches. An evaluation of A was assigned when no scratches were observed and an evaluation of B when scratches were observed.

For the magnetic tapes of Examples, the coefficient of friction was measured during the above back-and-forth running. Those tapes that exhibited a rise in the coefficient of friction of less than 0.1 between the first run and the 7,500th run were evaluated as A and those that exhibited 0.1 or greater were evaluated as B. None of the magnetic tapes of Examples exhibited a coefficient of friction of greater than 0.3 following 7,500 back and forth runs.

The magnetic tapes of Comparative Examples developed scratches during the above back-and-forth running. The scratches precluded stable detection of the coefficient of friction. Accordingly, the coefficients of friction of the magnetic tapes of Comparative Examples were not measured.

The results of the above are given in Table 2.

TABLE 2

| Magnetic tape No. | Ex. 1 | Ex. 2 | Ex. 3 | Ex. 4 | Ex. 5 | Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|
| Presence or absence of scratches due to repeated running | A | A | A | A | A | A | B | B | B | B | B | B |
| Increase in coefficient of friction due to repeated running | A | A | B | A | B | B | — | — | — | — | — | — |
| Quantity of surface fatty acid [mg/m$^2$] | 2.11 | 2.43 | 1.68 | 2.00 | 0.67 | 0.46 | 0.34 | 0.95 | 0.67 | 0.55 | 0.94 | 0.55 |
| Quantity of surface fatty acid ester [mg/m$^2$] | 5.20 | 5.47 | 4.52 | 5.20 | 2.75 | 2.06 | 4.31 | 6.92 | 6.00 | 5.57 | 6.44 | 0.00 |
| Quantity of surface fatty acid amide [mg/m$^2$] | 0.28 | 0.28 | 0.47 | 0.28 | 0.32 | 0.26 | 0.83 | 0.34 | 0.23 | 0.25 | 0.29 | 0.25 |
| Weight ratio Quantity of surface fatty acid ester/quantity of surface fatty acid | 2.46 | 2.25 | 2.69 | 2.60 | 4.08 | 4.48 | 12.68 | 7.28 | 8.96 | 10.13 | 6.85 | 0.00 |
| Weight ratio Quantity of surface fatty acid ester/quantity of surface fatty acid amide | 18.57 | 19.54 | 9.67 | 18.57 | 8.69 | 7.92 | 5.19 | 20.35 | 26.09 | 22.28 | 22.21 | 0.00 |
| Weight ratio Quantity of surface fatty acid ester/(quantity of surface fatty acid amide + quantity of surface fatty acid) | 2.18 | 2.02 | 2.10 | 2.28 | 2.78 | 2.86 | 3.68 | 5.36 | 6.67 | 6.96 | 5.24 | 0.00 |
| Magnetic layer coating liquid | 1 | 2 | 3 | 1 | 4 | 5 | 6 | 7 | 7 | 7 | 7 | 8 |
| Nonmagnetic layer coating liquid | 1 | 2 | 2 | 2 | 3 | 3 | 1 | 4 | 5 | 6 | 7 | 8 |
| Backcoat layer coating liquid | 1 | 2 | 1 | 1 | 2 | 2 | 1 | 1 | 1 | 1 | 1 | 1 |

Based on the results shown in Table 2, the magnetic tapes of Examples were determined to have excellent running durability (the generation of scratches with repeated running was inhibited).

An aspect of the present invention is useful in the field of manufacturing magnetic tapes for data storage such as data backup tapes, which are expected to afford high reliability over extended periods of use.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
    which comprises a nonmagnetic layer comprising nonmagnetic powder and binder on a nonmagnetic support, and comprises a magnetic layer comprising ferromagnetic powder and binder on the nonmagnetic layer;
    wherein a fatty acid ester, a fatty acid amide, and a fatty acid are contained in both of the magnetic layer and the nonmagnetic layer;
    the quantity of fatty acid ester per unit area of the magnetic layer in extraction components extracted from a surface of the magnetic layer with n-hexane falls within the range of 1.00 mg/m$^2$ to 10.00 mg/m$^2$; and
    the weight ratio of the quantity of fatty acid ester per unit area of the magnetic layer to the combined total of the quantity of fatty acid amide and the quantity of fatty acid, quantity of fatty acid ester/(quantity of fatty acid amide+quantity of fatty acid), per unit area of the magnetic layer falls within the range of 1.00 to 3.00 in the extraction components.

2. The magnetic tape according to claim 1, wherein the weight ratio of the quantity of fatty acid ester per unit area of the magnetic layer to the quantity of fatty acid amide per unit area of the magnetic layer in the extraction components, quantity of fatty acid ester/quantity of fatty acid amide falls within the range of 5.00 to 20.00.

3. The magnetic tape according to claim 1, wherein the weight ratio of the quantity of fatty acid ester per unit area of the magnetic layer to the quantity of fatty acid per unit area of the magnetic layer in the extraction components, quantity of fatty acid ester/quantity of fatty acid, falls within the range of 1.00 to 6.00.

4. The magnetic tape according to claim 1, wherein, in the extraction components,
   the weight ratio of the quantity of fatty acid ester per unit area of the magnetic layer to the quantity of fatty acid amide per unit area of the magnetic layer, quantity of fatty acid ester/quantity of fatty acid amide, falls within the range of 5.00 to 20.00, and
   the weight ratio of the quantity of fatty acid ester per unit area of the magnetic layer to the quantity of fatty acid per unit area of the magnetic layer, quantity of fatty acid ester/quantity of fatty acid, falls within the range of 1.00 to 6.00.

5. The magnetic tape according to claim 1, wherein the nonmagnetic powder of the nonmagnetic layer comprises at least carbon black.

6. The magnetic tape according to claim 1, wherein the nonmagnetic powder of the nonmagnetic layer comprises 10.00 to 100.00 weight parts of carbon black per the total quantity of 100.00 weight parts of nonmagnetic powder.

7. The magnetic tape according to claim 1, wherein the thickness of the nonmagnetic layer falls within the range of 0.03 µm to 0.20 µm.

8. The magnetic tape according to claim 1, which is a magnetic tape that has been formed by coating and drying a coating composition for forming a nonmagnetic layer on a nonmagnetic support to form a nonmagnetic layer, and then coating and drying a coating composition for forming the magnetic layer over the nonmagnetic layer.

9. A method of manufacturing a magnetic tape, wherein the magnetic tape to be manufactured is a magnetic tape which comprises a nonmagnetic layer comprising nonmagnetic powder and binder on a nonmagnetic support, and comprises a magnetic layer comprising ferromagnetic powder and binder on the nonmagnetic layer;
   wherein a fatty acid ester, a fatty acid amide, and a fatty acid are contained in both of the magnetic layer and the nonmagnetic layer;
   the quantity of fatty acid ester per unit area of the magnetic layer in extraction components extracted from a surface of the magnetic layer with n-hexane falls within the range of 1.00 mg/m$^2$ to 10.00 mg/m$^2$; and
   the weight ratio of the quantity of fatty acid ester per unit area of the magnetic layer to the combined total of the quantity of fatty acid amide and the quantity of fatty acid, quantity of fatty acid ester/(quantity of fatty acid amide+quantity of fatty acid), per unit area of the magnetic layer falls within the range of 1.00 to 3.00 in the extraction components; and wherein
   the method comprises:
   coating and drying a coating composition for forming the nonmagnetic layer on the nonmagnetic support to form the nonmagnetic layer; and
   coating and drying a coating composition for forming the magnetic layer on the nonmagnetic layer that has been formed to form the magnetic layer.

10. The method of manufacturing a magnetic tape according to claim 9, wherein, in the magnetic tape, the weight ratio of the quantity of fatty acid ester per unit area of the magnetic layer to the quantity of fatty acid amide per unit area of the magnetic layer in the extraction components, quantity of fatty acid ester/quantity of fatty acid amide falls within the range of 5.00 to 20.00.

11. The method of manufacturing a magnetic tape according to claim 9, wherein, in the magnetic tape, the weight ratio of the quantity of fatty acid ester per unit area of the magnetic layer to the quantity of fatty acid per unit area of the magnetic layer in the extraction components, quantity of fatty acid ester/quantity of fatty acid, falls within the range of 1.00 to 6.00.

12. The method of manufacturing a magnetic tape according to claim 9, wherein, in the extraction components of the magnetic tape,
   the weight ratio of the quantity of fatty acid ester per unit area of the magnetic layer to the quantity of fatty acid amide per unit area of the magnetic layer, quantity of fatty acid ester/quantity of fatty acid amide, falls within the range of 5.00 to 20.00, and
   the weight ratio of the quantity of fatty acid ester per unit area of the magnetic layer to the quantity of fatty acid per unit area of the magnetic layer, quantity of fatty acid ester/quantity of fatty acid, falls within the range of 1.00 to 6.00.

13. The method of manufacturing a magnetic tape according to claim 9, wherein, in the magnetic tape, the nonmagnetic powder of the nonmagnetic layer comprises at least carbon black.

14. The method of manufacturing a magnetic tape according to claim 9, wherein, in the magnetic tape, the nonmagnetic powder of the nonmagnetic layer comprises 10.00 to 100.00 weight parts of carbon black per the total quantity of 100.00 weight parts of nonmagnetic powder.

15. The method of manufacturing a magnetic tape according to claim 9, wherein, in the magnetic tape, the thickness of the nonmagnetic layer falls within the range of 0.03 µm to 0.20 µm.

* * * * *